US012608408B2

(12) United States Patent
Sachdeva et al.

(10) Patent No.: US 12,608,408 B2
(45) Date of Patent: Apr. 21, 2026

(54) MACHINE LEARNING-BASED EVALUATION OF RECORDED INTERACTIONS

(71) Applicant: Observe.AI, Inc., Redwood City, CA (US)

(72) Inventors: Aashraya Sachdeva, Mohali (IN); Digvijay Anil Ingle, Akola (IN); Mayank Sati, Nainital (IN); Surya Prakash Sahu, Khorda (IN); Cijo George, Bengaluru (IN); Claudia Lee, El Dorado Hills, CA (US); Bhasker Sharma, Bengaluru (IN); Jithendra Vepa, Bengaluru (IN)

(73) Assignee: Observe.AI, Inc., Redwood City, CA (US)

( * ) Notice: Subject to any disclaimer, the term of this patent is extended or adjusted under 35 U.S.C. 154(b) by 0 days.

(21) Appl. No.: 19/178,757

(22) Filed: Apr. 14, 2025

(65) Prior Publication Data

US 2026/0056986 A1 Feb. 26, 2026

Related U.S. Application Data

(60) Provisional application No. 63/685,522, filed on Aug. 21, 2024.

(51) Int. Cl.
*G06F 16/3329* (2025.01)
*G06F 16/332* (2019.01)

(52) U.S. Cl.
CPC .... *G06F 16/33295* (2025.01); *G06F 16/3326* (2019.01)

(58) Field of Classification Search
CPC ........... G06F 16/33295; G06F 16/3329; G06F 16/3326; G06F 16/332
See application file for complete search history.

(56) References Cited

U.S. PATENT DOCUMENTS 12,204,524 B1 * 1/2025 Birru ................. G06F 16/90335
12,326,869 B1 * 6/2025 Alperin .................... G06N 3/04
(Continued)

OTHER PUBLICATIONS

Abdin et al. "Phi-3 technical report: A highly capable language model locally on your phone." arXiv preprint arXiv:2404.14219 (2024).
(Continued)

*Primary Examiner* — Huyen X Vo
(74) *Attorney, Agent, or Firm* — Van Pelt, Yi & James LLP

(57) ABSTRACT

Machine learning-based evaluation of recorded interactions is disclosed, including: obtaining an evaluation plan to correspond to a new question; retrieving a representative interaction based at least in part on the new question; using a reasoning and answer language model to evaluate the representative interaction against the new question based at least in part on the evaluation plan and to provide a preview evaluation result; outputting, at a user interface, the new question and the preview evaluation result of the representative interaction; receiving, via the user interface, user feedback to the preview evaluation result; updating the reasoning and answer language model based at least in part on the user feedback to the preview evaluation result; and storing a feedback data set including the user feedback.

19 Claims, 16 Drawing Sheets

(56) References Cited

U.S. PATENT DOCUMENTS

2025/0124060 A1* 4/2025 Hackman ............ G06F 16/3329
2025/0245233 A1* 7/2025 Jain ................... G06F 16/24578

OTHER PUBLICATIONS

Achiam et al. "Gpt-4 technical report." arXiv preprint arXiv:2303.08774 (2023).
Ali et al. "Word error rate estimation for speech recognition: e-WER." Proceedings of the 56th Annual Meeting of the Association for Computational Linguistics (vol. 2: Short Papers). Association for Computational Linguistics (ACL), 2018.
Anonymous, "Introducing the next generation of Claude", Mar. 4, 2024 from https://www.anthropic.com/news/claude-3-family, access on Apr. 14, 2025.
Chen et al. "Learning to maximize mutual information for chain-of-thought distillation." arXiv preprint arXiv:2403.03348 (2024).
Chen et al. "Program of thoughts prompting: Disentangling computation from reasoning for numerical reasoning tasks." arXiv preprint arXiv:2211.12588 (2022).
Deng et al. "Implicit chain of thought reasoning via knowledge distillation." arXiv preprint arXiv:2311.01460 (2023).
Fu et al. "Entity-level sentiment analysis in contact center telephone conversations." arXiv preprint arXiv:2210.13401 (2022).
Gemini Team et al. "Gemini: a family of highly capable multimodal models." arXiv preprint arXiv:2312.11805 (2023).
Gemma Team et al. "Gemma: Open models based on gemini research and technology." arXiv preprint arXiv:2403.08295 (2024).
Girish et al. "Interpretabilty of Speech Emotion Recognition modelled using Self-Supervised Speech and Text Pre-Trained Embeddings." Interspeech. 2022.
Guruju et al., "Addressing Compliance in Call Centers with Entity Extraction." Proc. Interspeech 2021 (2021):2347-2348.
Ingle et al. "Listening to Silences In Contact Center Conversations Using Textual Cues." Proc. Interspeech 2023. 2023.
Kim et al. "The CoT collection: Improving zero-shot and few-shot learning of language models via chain-of-thought fine-tuning." arXiv preprint arXiv:2305.14045 (2023).
Li et al. "Symbolic chain-of-thought distillation: Small models can also "think" step-by-step." arXiv preprint arXiv:2306.14050 (2023).
Luo et al. "BioGPT: generative pre-trained transformer for biomedical text generation and mining." Briefings in bioinformatics 23.6 (2022): bbac409.
Nathan et al. "Can probing classifiers reveal the learning by contact center large language models?: No, it doesn't !." Proceedings of the Fifth Workshop on Insights from Negative Results in NLP. 2024.
Petroni, et al. "Language models as knowledge bases?." arXiv preprint arXiv:1909.01066 (2019).
Roberts et al. "How much knowledge can you pack into the parameters of a language model?." arXiv preprint arXiv:2002.08910 (2020).
Roy et al., "QART: A System for Real-Time Holistic Quality Assurance for Contact Center Dialogues", Proceedings of the Thirtieth AAAI Conference on Artificial Intelligence (AAAI-16) 2016.
Roziere et al. "Code llama: Open foundation models for code." arXiv preprint arXiv:2308.12950 (2023).
Singhal et al. "Large language models encode clinical knowledge." Nature 620.7972 (2023): 172-180.
Touvron et al., "Llama: Open and efficient foundation language models." arXiv preprint arXiv:2302.13971 (2023).
Van Veen et al. "Adapted large language models can outperform medical experts in clinical text summarization." Nature medicine 30.4 (2024): 1134-1142.
Wang, et al. "Codet5: Identifier-aware unified pre-trained encoder-decoder models for code understanding and generation." arXiv preprint arXiv:2109.00859 (2021).
Wei et al. "Chain-of-thought prompting elicits reasoning in large language models." Advances in neural information processing systems 35 (2022): 24824-24837.
Wei et al. "Finetuned language models are zero-shot learners." arXiv preprint arXiv:2109.01652 (2021).
Wolf et al. "Transformers: State-of-the-art natural language processing." Proceedings of the 2020 conference on empirical methods in natural language processing: system demonstrations. 2020.
Wu et al. "BloombergGPT: A large language model for finance." arXiv preprint arXiv:2303.17564 (2023).
Yao et al. "Tree of thoughts: Deliberate problem solving with large language models." Advances in neural information processing systems 36 (2023): 11809-11822.
Yu et al. "Kola: Carefully benchmarking world knowledge of large language models." arXiv preprint arXiv:2306.09296 (2023).
Yuan et al. "Large language models illuminate a progressive pathway to artificial intelligent healthcare assistant." Medicine Plus (2024): 100030.
Zhang, et al. "Sentiment analysis in the era of large language models: A reality check." arXiv preprintarXiv:2305.15005 (2023).
Zhu et al. "Multilingual machine translation with large language models: Empirical results and analysis." arXiv preprint arXiv:2304.04675 (2023).

* cited by examiner

300

During a configuration phase, configure a reasoning and answer language model to generate preview evaluation results corresponding to each of a plurality of new questions based at least in part on representative interactions          302

During an inference phase, prompt the reasoning and answer language model to provide evaluation results corresponding to the plurality of new questions for a new interaction          304

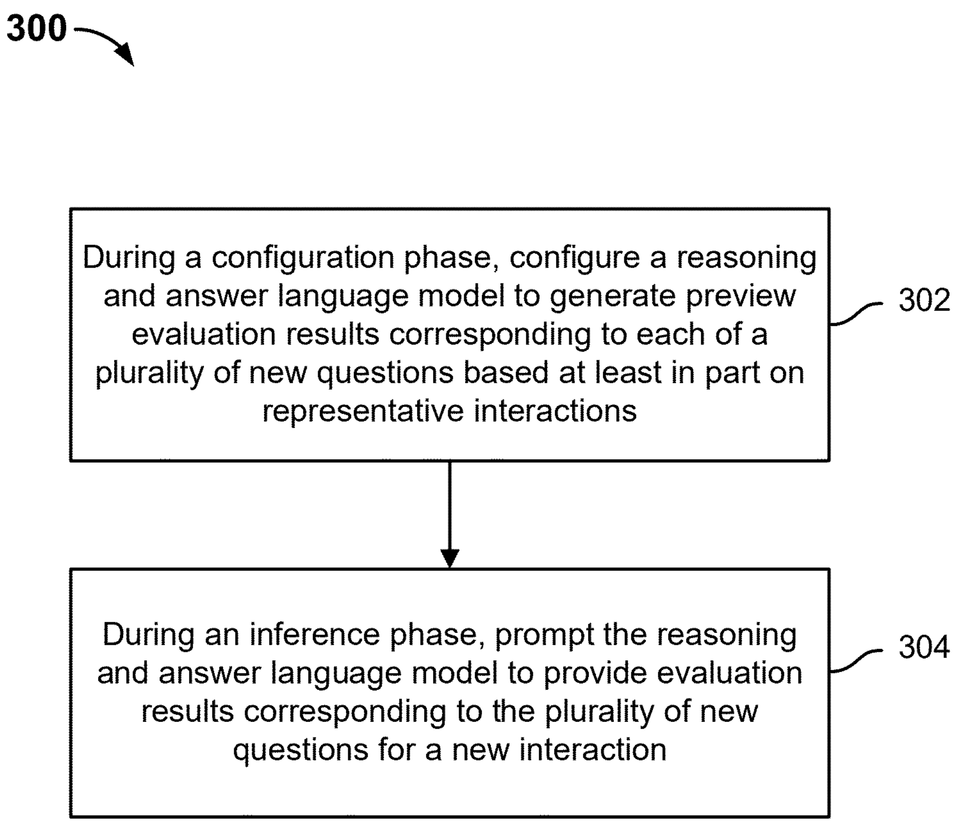

Obtain an evaluation plan to correspond to a new question — 402

Retrieve a representative interaction based at least in part on the new question — 404

Use a reasoning and answer language model to evaluate the representative interaction against the new question based at least in part on the evaluation plan and provide a preview evaluation result — 406

Output, at a user interface, the new question and the preview evaluation result of the representative interaction — 408

Receive, via the user interface, user feedback to the preview evaluation result — 410

Update the reasoning and answer language model based at least in part on the user feedback to the preview evaluation result — 412

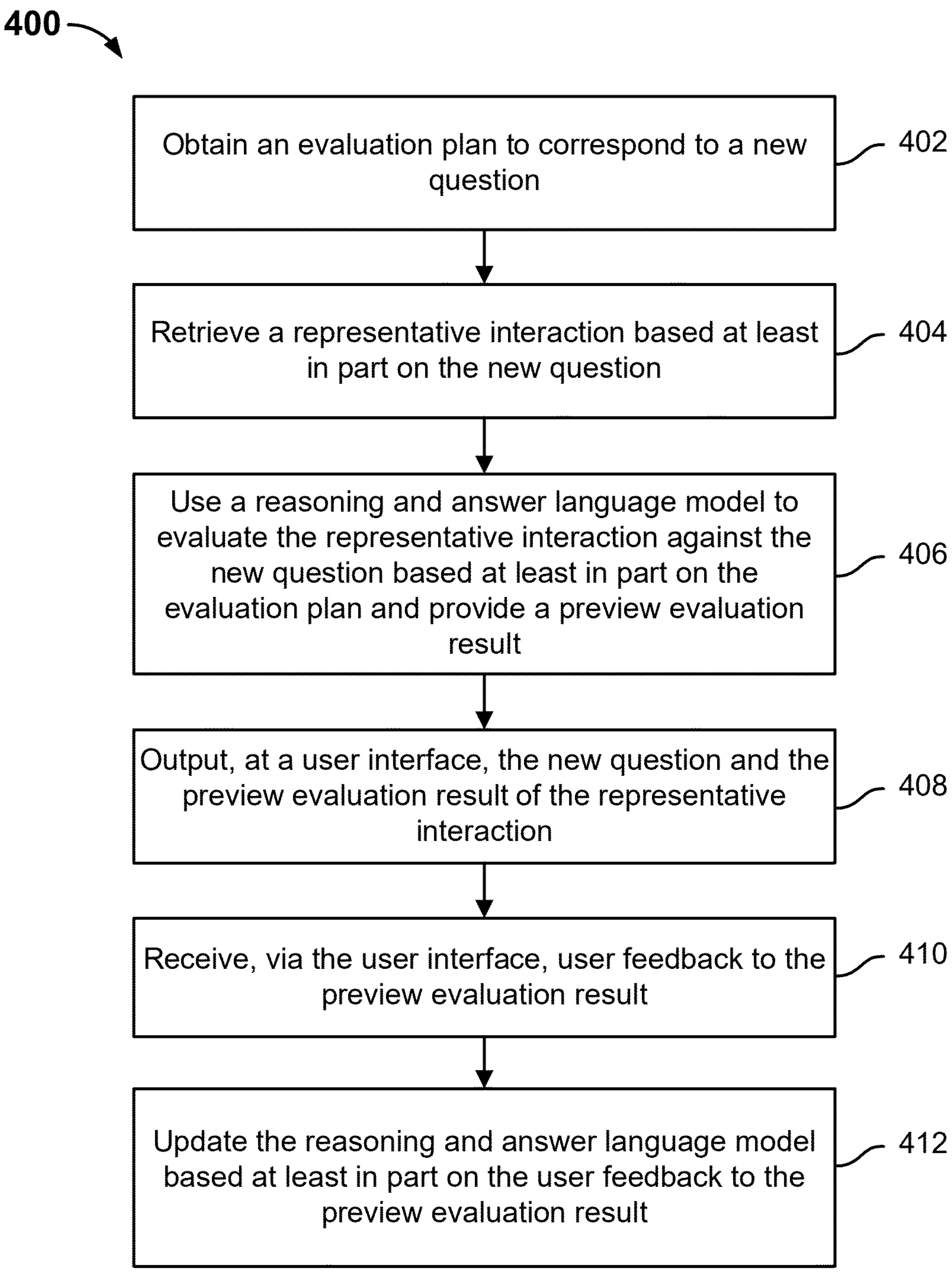

Start

Receive, via a user interface, a submitted question — 702

Refinement needed? — 704

No

Yes

Prompt, at the user interface, for additional information related to the submitted question — 706

Receive, via the user interface, the additional information — 708

Refine the submitted question based on the additional information — 710

Store the refined question as a predefined question — 712

End

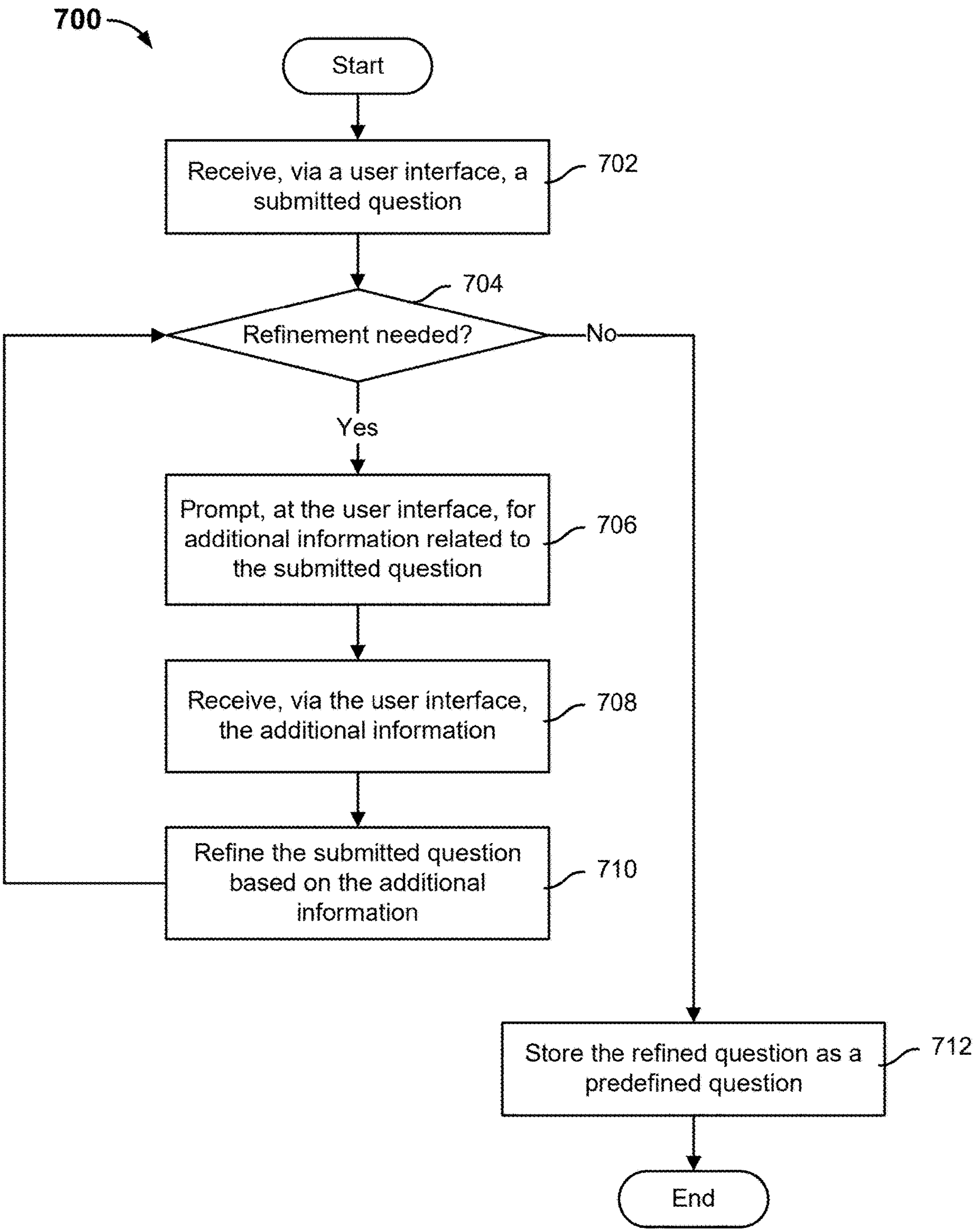

Receive a predefined question — 802

Generate a plurality of candidate evaluation plans based on the predefined question — 804

Determine a plurality of accuracies corresponding to respective ones of the plurality of candidate evaluation plans — 806

Select a candidate evaluation plan to correspond to the predefined question based on the plurality of accuracies — 808

Optionally, receive reviewer user feedback to the selected candidate evaluation plan — 810

Generate a feedback dataset corresponding to candidate evaluation plan generation technique(s) based on the reviewer user feedback — 812

Fine-tune the candidate evaluation plan generation technique(s) based on the feedback dataset — 814

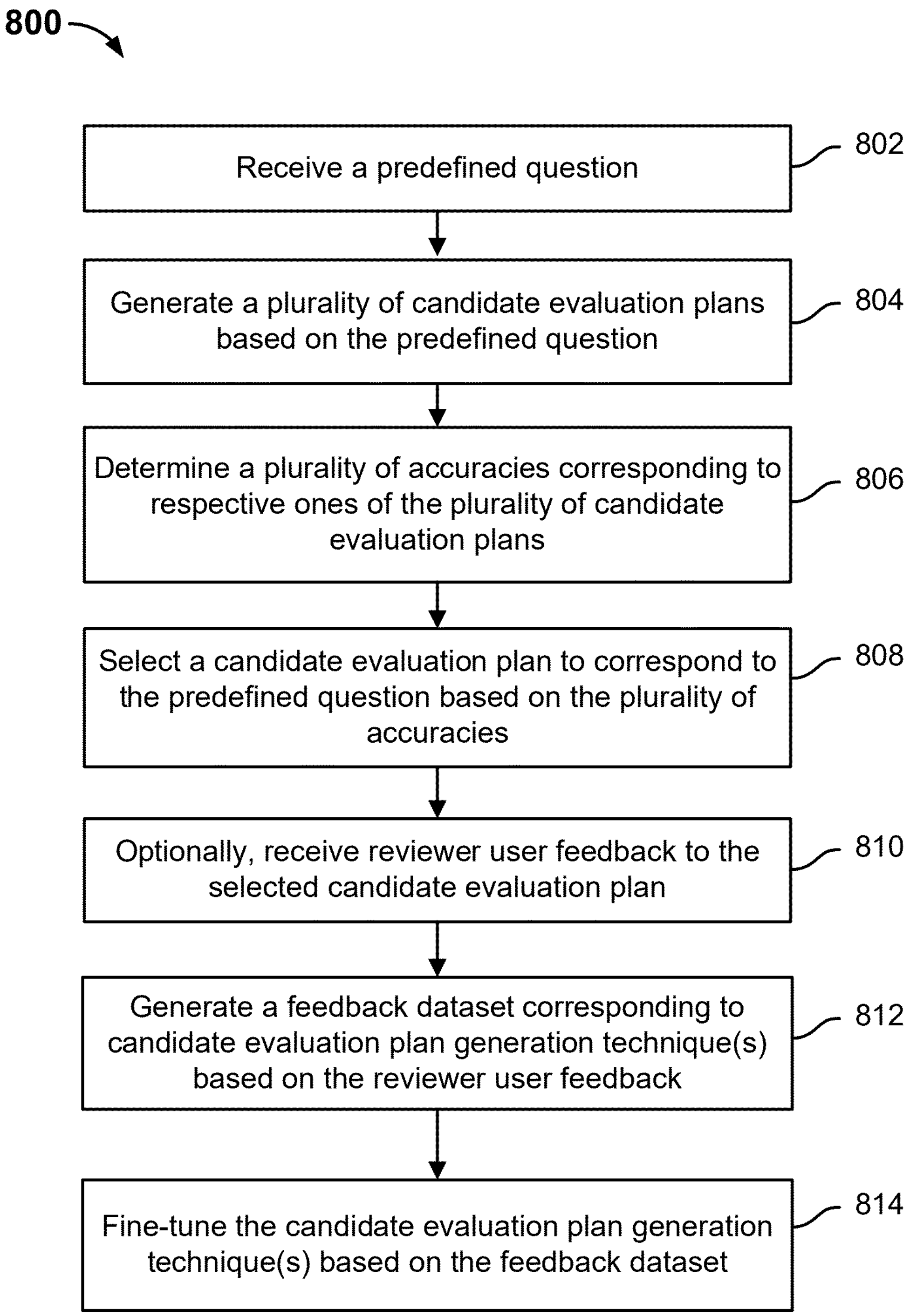

Answer the question - *"Did the agent end the call with proper closing?"* based on a conversation Certainly! Could you please clarify what qualifies as a 'proper closing'?

The agent should express gratitude and use branding for the company.

Thank you! Here's how i think it could be answered.

The question can be answered using the context of the conversation, by analyzing the agent's closing statements. The task requires identifying specific phrases or actions that indicate agent showing gratitude towards the customer, confirming if they need any further assistance and using branding statements for the organisation.

Is my understanding correct?

*Yes, configure rule for me!*

*No, I have additional suggestion*

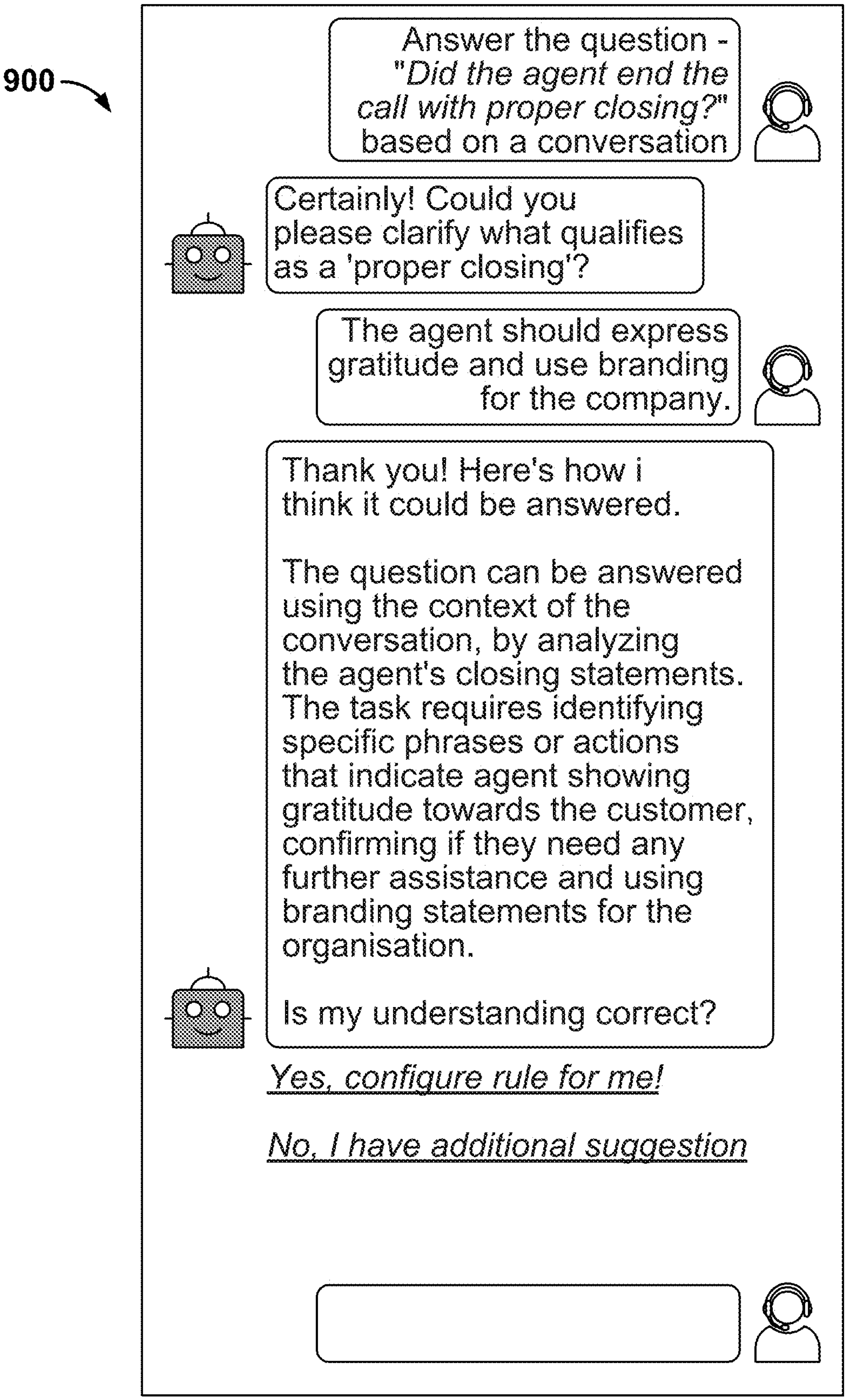

FIG. 9A

Evaluation Plan

'name': 'Asked customer to repeat', 'description': 'The agent asked the customer to repeat what they said, indicating a lack of active listening.', 'non-negotiable': 'True'

'name': 'Customer had to clarify', 'description': 'The customer had to clarify or rephrase their statement, suggesting the agent did not fully understand or listen to the initial statement.', 'non-negotiable': 'True'

1002

Evaluation Plan Generation Model

1004

1006

1012

Question: Did the agent demonstrate a lack of listening?

1. There is no evidence in the conversation that the agent asked the customer to repeat what they said, indicating active listening from the agent's side.

2. The customer had to clarify or rephrase their statement a few times, suggesting the agent did not fully understand or listen to the initial statement. For example:

"it doesn't say reverse so has been requested like the other one does"

The customer had to clarify that the reversal was not showing as requested for one of the employees.

"it doesn't say that the reversal request was sent it only says status deposited miss it's action reverse pay it's still giving me the option to click on it but when i do it says that it's already in process which is not true because i haven't done it"

The customer had to explain the issue they were facing with the reversal request multiple times.

Based on the evidences, the agent did not ask the customer to repeat themselves, which is a positive sign of active listening. However, the customer had to clarify or rephrase their statements multiple times, suggesting that the agent did not fully understand or listen to the initial statements. This indicates a lack of active listening from the agent's side to some extent.

Hence, the final answer is: "Yes"

1008

Reasoning & Answer Language Model

1010

Representative Interaction

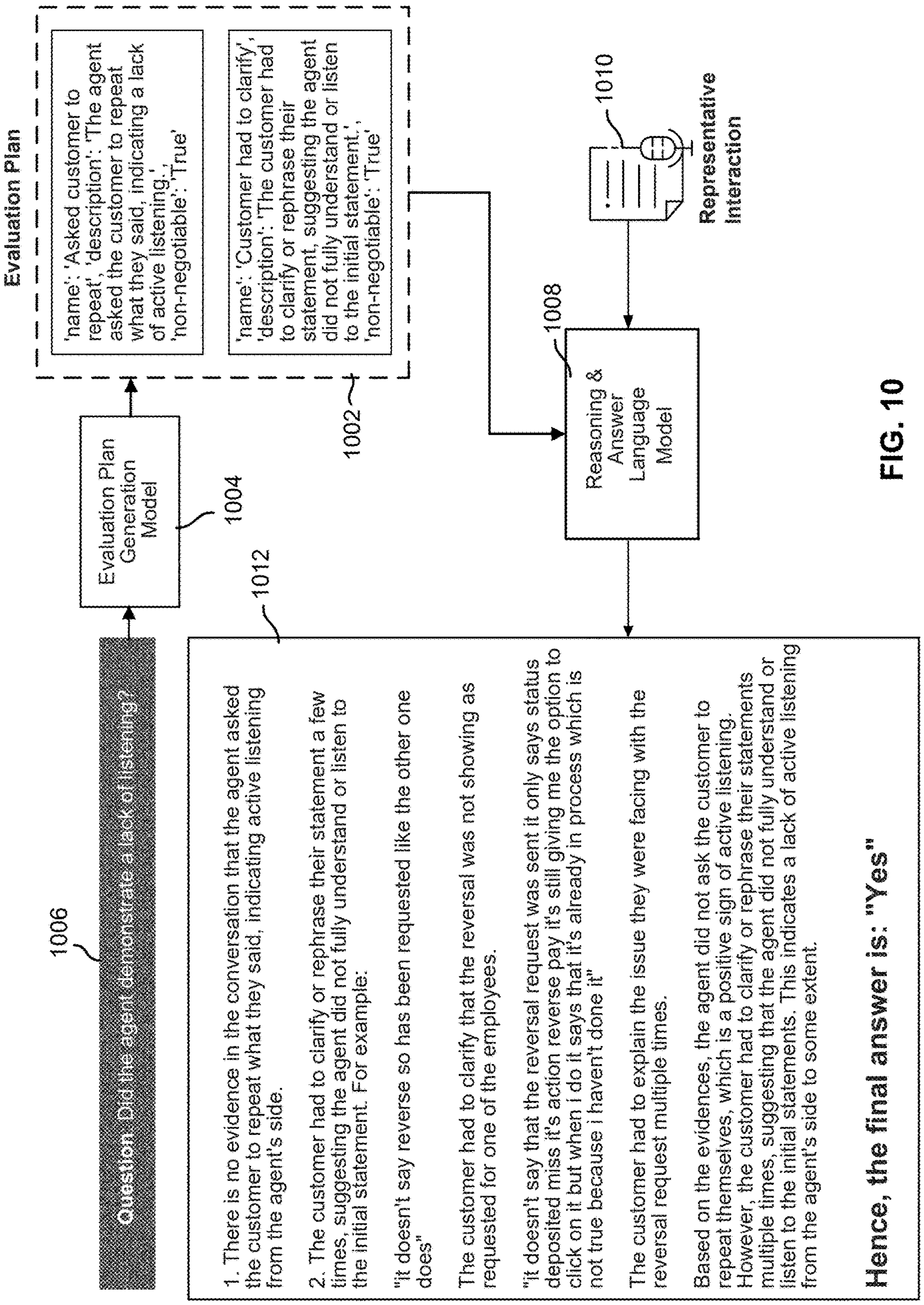

Start

Receive a new interaction and a predefined question with which to evaluate the new interaction — 1302

Obtain, from storage, an evaluation plan corresponding to the predefined question — 1304

Prompt a reasoning and answer language model given the predefined question, the evaluation plan, and the new interaction — 1306

Receive a set of reasoning and answer to the predefined question from the reasoning and answer language model — 1308

Receive, via a user interface, user feedback to the set of reasoning and answer associated with the new interaction — 1310

Include the user feedback in a feedback dataset — 1312

Fine-tune the reasoning and answer language model based at least in part on the feedback dataset — 1314

End

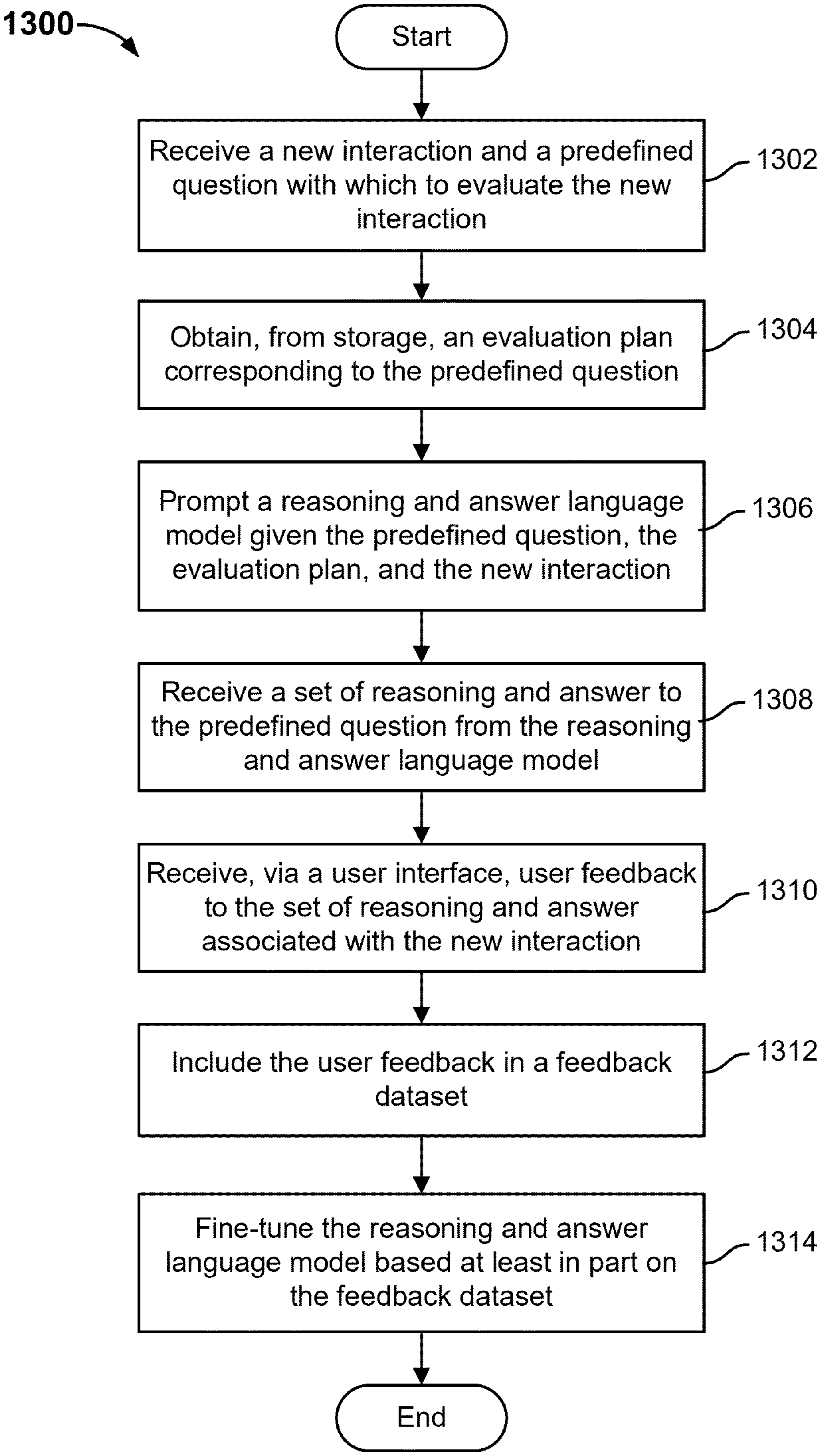

FIG. 13

MACHINE LEARNING-BASED EVALUATION OF RECORDED INTERACTIONS

CROSS REFERENCE TO OTHER APPLICATIONS

This application claims priority to U.S. Provisional Patent Application No. 63/685,522 entitled MACHINE LEARNING-BASED EVALUATION OF RECORDED INTERACTIONS filed Aug. 21, 2024 which is incorporated herein by reference for all purposes.

BACKGROUND OF THE INVENTION

An interaction between individuals of different roles may be recorded and evaluated for quality assurance of at least one individual's performance during the interaction. One example of an interaction is a phone call or a series of text-based correspondences between a customer and a customer service providing agent. Such an interaction could be recorded and evaluated to determine the quality of the agent's performance. Quality assurance of an agent's performance is typically performed manually by a person using evaluation forms and a set of questions with categorical answer options (e.g., yes, no, not available). However, this conventional form of quality assurance on an agent's performance involves reviewing the entire audio and/or text transcript of the recorded interaction, which may be laborious and also inconsistent across different human reviewers.

BRIEF DESCRIPTION OF THE DRAWINGS

Various embodiments of the invention are disclosed in the following detailed description and the accompanying drawings.

FIG. 3 is a flow diagram showing an example process for preparing and using a reasoning and answer language model to programmatically evaluate interactions in accordance with some embodiments.

FIG. 4 is a flow diagram showing an embodiment of a process for configuring a reasoning and answer language model to programmatically evaluate interactions.

FIG. 7 is a flow diagram showing an example of a process for refining a submitted question during the configuration of a reasoning and answer language model to programmatically evaluate interactions in accordance with some embodiments.

FIG. 8 is a flow diagram showing an example of a process for selecting an evaluation plan corresponding to a predefined question during the configuration of a reasoning and answer language model to programmatically evaluate interactions in accordance with some embodiments.

FIG. 9A is a diagram showing an example of a configuration user interface over which a user can be prompted by an automated assistant to provide additional information to a submitted question during the configuration of a reasoning and answer language model to programmatically evaluate interactions in accordance with some embodiments.

FIG. 10 is a schematic diagram showing prompting of a reasoning and answer language model to programmatically evaluate a representative interaction given a question and evaluation pair in accordance with some embodiments.

FIG. 13 is a flow diagram showing an example of a process for using, at inference, a previously configured reasoning and answer language model to programmatically evaluate new interactions in accordance with some embodiments.

DETAILED DESCRIPTION

Figure 1:
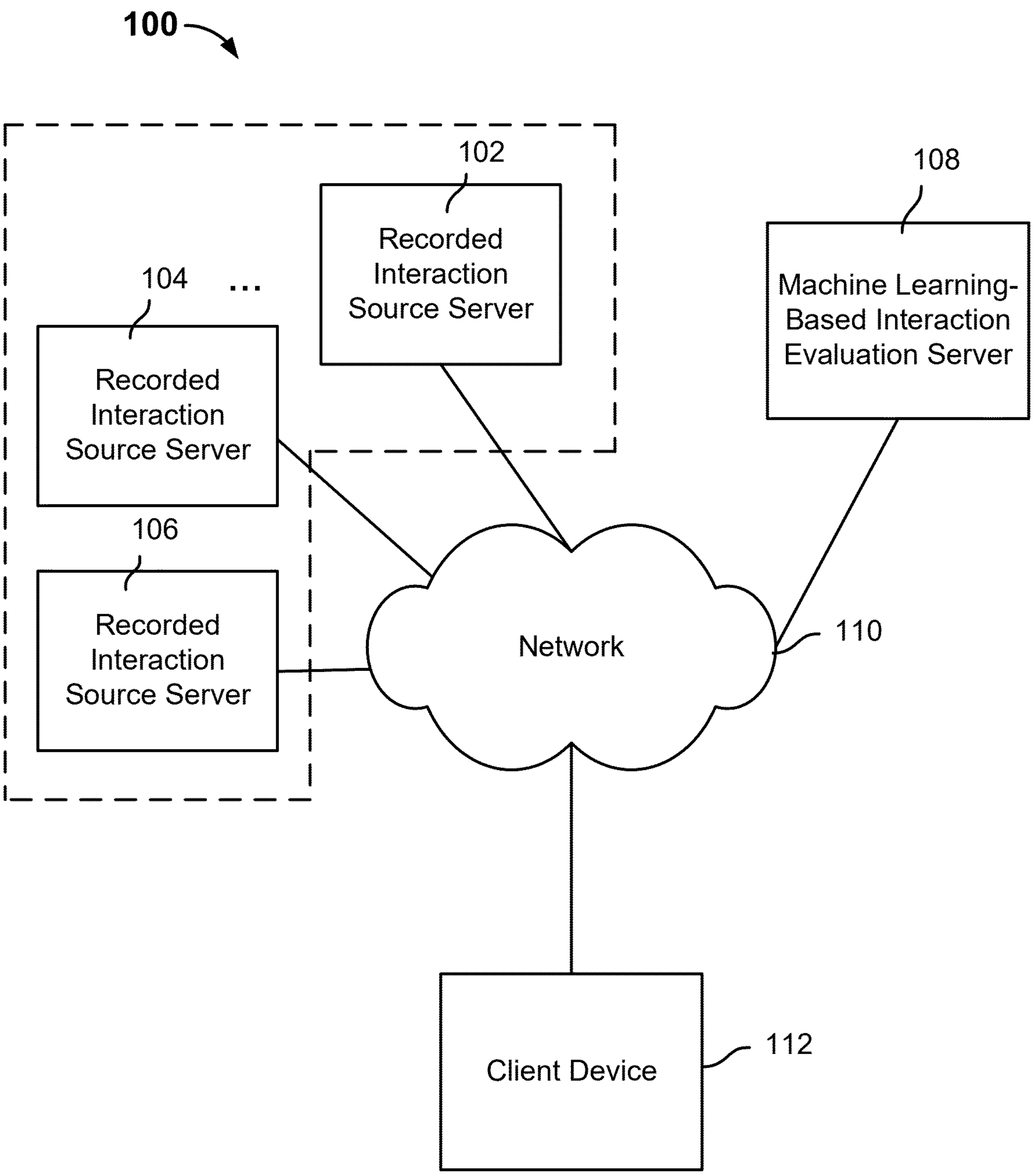
FIG. 1 is a diagram showing an embodiment of a system for machine learning-based evaluation of recorded interactions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of machine learning-based evaluation of recorded interactions are described herein. In various embodiments, a new question that is used to evaluate at least one aspect of an interaction is received. In some embodiments, the new question can be answered with a "yes" or "no" answer. In some embodiments, the new question can be answered with an answer other than just "yes" or "no," such as, for example, an open-ended answer or one of two or more enumerated possible answers. The new question may be user submitted during the configuration/calibration phase of a reasoning and answer language model for the purpose of including the question in subsequent programmatic evaluations by the model against new interactions during a later inference phase, as will be described in further detailed below. For example, if the interaction includes a recorded audio stream, a text transcript of the recorded audio stream, or a series of text-based correspondences (e.g., chat messages or emails) between a customer and a contact center agent, then the new question may inquire whether the agent performed or omitted to perform a specified task (e.g., performed identity verification of the customer) during the interaction. For example, the interaction includes the conversation of at least two participants and where each participant's speech or text contribution to the interaction is tagged or otherwise identifiable within the interaction. An evaluation plan is selected to correspond to a new question. In some embodiments, the evaluation plan that is selected to correspond to this new question comprises a structured configuration representation or a machine-understandable distillation of one or more sub-components of the new question. For example, the evaluation plan may describe a set of criteria that needs to be met by at least the agent's portion of the interaction to result in a specified answer (e.g., "yes") to the question. A representative interaction is retrieved based at least in part on the new question. In some embodiments, a representative interaction comprises a historically recorded interaction. The ability of the reasoning and answer language model to answer the new question is "previewed" using the representation interaction. A reasoning and answer language model is used to evaluate the representative interaction against the new question based at least in part on the evaluation plan and provide a preview evaluation result. In various embodiments, the reasoning and answer language model comprises a third-party, base large language model (LLM). In various embodiments, an "evaluation result" for a given interaction comprises an answer (e.g., a "yes," "no," or another answer) to the question and also a set of reasoning/rationale that explains why the answer was determined and potentially, citations to relevant portions of the given interaction. The preview evaluation result (comprising at least the answer to the new question and a set of reasoning behind the answer) that is output from the reasoning and answer language model in response to the given new question, representative interaction, and evaluation plan is presented at a user interface. User feedback to the evaluation result is received from the user interface. For example, the user feedback may include a correction to or an approval/confirmation/validation of the answer to the new question and/or the set of reasoning behind the answer. The reasoning and answer language model is then fine-tuned (eventually) based at least in part on that user feedback (along with other instances of user feedback to preview evaluation results output by the model to different questions during the configuration/calibration phase).

As will be described in further detail below, during the configuration/calibration phase, the reasoning and answer language model may be fine-tuned using instances of user feedback to the model's output evaluation results to different input sets of new questions, preview evaluation plans corresponding to the new questions, and representative interactions until a threshold is met. Then, during the inference phase, the reasoning and answer language model is prompted to generate evaluation results of new interactions against one or more questions and corresponding evaluation plans for which the model was previously configured/calibrated to evaluate during the earlier configuration phase.

Furthermore, in some embodiments, the evaluation plan that is selected to be aligned with a new question during the configuration/calibration phase may have been defined by an LLM in a one-time definition process. The LLM used to define the evaluation plan can be comparatively larger (e.g., includes a larger number of parameters) and has been empirically determined to be more proficient in (e.g., contact center) interaction domain-knowledge. For example, the empirical determination of which LLMs (the LLMs can be distinguished by at least the number of parameters that they use) are more proficient in contact center interactions may be determined by prompting each different LLM to evaluate each of multiple interactions against respective questions. The LLMs' respective output evaluation results are then compared to human annotated ground truth evaluation results and then each LLM is scored (e.g., using a Macro F1 score) based on the comparisons. Those LLMs with greater Macro F1 scores are determined to have more proficiency and domain-knowledge in evaluating interactions. As such, the evaluation plan that is defined by this larger LLM can provide not only a structured evaluation criteria for the new question but also breaks down the question into simpler components/criteria that can be easily comprehended by smaller LLMs (e.g., LLMs with fewer parameters than the number of parameters used by the larger LLM that had generated the evaluation plan). The defined evaluation plan for the new question can then be stored as a pair with that defined question during the configuration/calibration phase. Then, later, during the inference phase, the pair of the predefined question and its corresponding predefined evaluation plan can be retrieved from storage and included in a prompt to the reasoning and answer language model to evaluate each new interaction. In some embodiments, the reasoning and answer language model comprises an LLM that is smaller (e.g., has fewer parameters and therefore is less computationally expensive to run) than the LLM that was used to define the evaluation plans. In this way, the domain-knowledge of the larger LLM for evaluation plan generation is transferred to the smaller LLM for interaction evaluation via the defined evaluation plan. As such, at least some embodiments can efficiently use a larger LLM to define an evaluation plan corresponding to a question once during the configuration/calibration phase and then during inference, repeatedly using a relatively smaller LLM (the reasoning and answer language model) to leverage this previously defined pair of question and evaluation plan to evaluate new interactions. This two-step process balances the limited use of the more domain-knowledgeable but computationally more expensive LLMs for evaluation plan generation with the (potentially) repeated use of the less domain-knowledgeable but computationally less expensive LLM for evaluating new interactions.

FIG. 1 is a diagram showing an embodiment of a system for machine learning-based evaluation of recorded interactions. As shown in FIG. 1, system 100 includes recorded interaction source server 102, recorded interaction source server 104, recorded interaction source server 106, machine learning-based interaction evaluation server 108, network 110, and client device 112. Each of recorded interaction source server 102, recorded interaction source server 104, recorded interaction source server 106, machine learning-based interaction evaluation server 108, and client device 112 can communicate to each other over network 110.

Each of recorded interaction source server 102, recorded interaction source server 104, and recorded interaction source server 106 is configured to record interactions and/or obtain recorded interactions. In various embodiments, a "recorded interaction" comprises a recorded text-based, audio-based, and/or video-based exchange between two or more participants. Examples of a recorded interaction include a recorded phone call between two or more participants, a recorded history/log of a chat message conversation between two or more participants, a recorded video conversation between two or more participants, etc. In a specific example, a recorded interaction source server comprises a server located in a "call center" or "contact center." An example of a "contact center" is an organization where customers of product(s) or service(s) contact to speak to customer service agents for customer support services. Contact centers often record interactions (e.g., phone calls, emails, or a series of chat messages) between their agents and customers for quality assurance and analytics use-cases. In the contact center context, participants in a recorded interaction may include a customer service agent and a customer and where the agent is assisting the customer in resolving an issue. Traditionally, these interactions are often manually evaluated (e.g., by an evaluator user) and scored (e.g., by the evaluator user) against a questionnaire of Yes/No questions for agent quality assurance (QA). A significant percentage of questions in such questionnaires are complex questions that are time consuming for human QA analysts to evaluate. This is because often there exists multiple factors that contribute to whether a given question should be answered "yes" or "no." Furthermore, the evidence for these factors may be present in different parts of the interaction, which makes it time consuming for a human evaluator to manually locate within the recorded interaction. This complexity of the reviews also makes such questions difficult to be consistently answered by human evaluators, since the human evaluators often have different opinions on the factors that determine the answer, and often even possess different interpretations for a given set of factors/evidence. While three recorded interaction source servers (e.g., 102, 104, and 106) are shown in the example of FIG. 1, in other examples, fewer or more recorded interaction source servers may be used to record interactions and/or obtain recorded interactions. In some embodiments, for a given question, plan, and/or interaction, if the user does not make an edit to the generated reasoning and predicted answer, then the model response is deemed correct. But if the user does make a correction or edit to the generated reasoning and predicted answer, then the model response is deemed incorrect.

Client device 112 is configured to access a configuration user interface that is provided by machine learning-based interaction evaluation server 108 and where the configuration user interface is configured to enable a user to submit/configure a new question that is to be programmatically answered by a reasoning and answer language model provided by machine learning-based interaction evaluation server 108 on a given interaction (e.g., obtained from a recorded interaction source server such as one of recorded interaction source server 102, 104, and 106). In some embodiments, the new question is submitted as natural language text input and is one that can be answered with a "yes" or "no" answer. In some embodiments, the new question is submitted as natural language text input and is one that can be answered with an answer other than just "yes" or "no," such as, for example, an open-ended answer or one of two or more enumerated possible answers. A first example question is "did the agent accurately provide next payment date and amount?" A second example question is "did the agent properly acknowledge the customer inquiry?"

Machine learning-based interaction evaluation server 108 is configured to receive the new question submitted from client device 112 during a configuration phase of the reasoning and answer language model. In some embodiments, machine learning-based interaction evaluation server 108 is configured to analyze whether the submitted new question needs to be refined with further information and if so, machine learning-based interaction evaluation server 108 will prompt the user at the configuration user interface for additional information to generate a refined question. In some embodiments, machine learning-based interaction evaluation server 108 is configured to obtain/generate one or more candidate evaluation plans that describe a set of components or a set of criteria that is distilled from the new question. As will be described in further detail below, each candidate evaluation plan can be generated using a different configuration mechanism. At least one configuration mechanism can be a large language model (LLM) that has been empirically determined to demonstrate domain-knowledge in the relevant application (e.g., contact center interaction evaluation). Machine learning-based interaction evaluation server 108 is configured to select one candidate evaluation plan (e.g., based on the candidate evaluation plan's respectively determined accuracies) to serve as the defined evaluation plan for this particular new question. In some embodiments, machine learning-based interaction evaluation server 108 may present the selected defined evaluation plan at the configuration user interface (e.g., presented at client device 112) to receive any user submitted edits prior to saving the new question and the selected evaluation plan as a pair (in a mapping). For example, in the event that the LLM that had generated the evaluation plan had included in errors or hallucinated information in the plan, a user's edits to the plan, prior to prompting the reasoning and answer language model with the plan, can act as guardrails on the use of the LLM's provided evaluation plan.

During the phase of configuring/calibrating the reasoning and answer language model to programmatically evaluate interactions for the new question, machine learning-based interaction evaluation server 108 is configured to obtain a set of representative interactions corresponding to the new question. In some embodiments, the reasoning and answer language model comprises another LLM but one that is smaller (e.g., uses fewer parameters) than and/or has been empirically determined to possess less domain-knowledge than the LLM that had been used to generate the evaluation plan corresponding to the new question. In some embodiments, representative interactions are the transcripts of historically recorded interactions. For each input set which includes the new question, the evaluation plan corresponding to the new question, and a representative interaction, machine learning-based interaction evaluation server 108 is configured to prompt the reasoning and answer language model to evaluate the new question against the representative interaction using the guidance provided by the evaluation plan. The evaluation result of the new question against the representative interaction that is provided by machine learning-based interaction evaluation server 108 represents a "preview" of the quality of the evaluation that can be provided by the current version of the reasoning and answer language model for the new question. This preview evaluation result may be presented at a user interface that is provided to a client device (e.g., client device 112) for a reviewing user. The reviewing user can provide feedback (e.g., a confirmation or edits/corrections) to any portion of the preview evaluation result (e.g., the answer and/or the set of reasoning behind the answer). In the event that user feedback had been provided to the evaluation result of the new question against representative interaction, machine learning-based interaction evaluation server 108 can add the user confirmed/corrected/edited preview evaluation result along with the input set including the new question, the evaluation plan corresponding to the new question, and the representative interaction into a feedback dataset.

During the configuration phase, machine learning-based interaction evaluation server 108 may receive one or more submitted new questions and for each question, obtain a respective corresponding evaluation plan to store with each new question, obtain representative interactions corresponding to each new question, prompt (the current version of) the reasoning and answer language model to evaluate each retrieved representative interaction for a given pair of new question and corresponding evaluation plan, and present preview evaluation results of representative interfaces at a user interface for possible user feedback, as described above. Machine learning-based interaction evaluation server 108 is also configured to add user confirmed or modified preview evaluation results of representative interactions into the feedback dataset. Periodically or in response to an event, machine learning-based interaction evaluation server 108 is configured to use the feedback dataset as training data to fine-tune (the current version of) the reasoning and answer language model.

After the configuration phase in which machine learning-based interaction evaluation server 108 has configured the reasoning and answer language model to provide evaluations corresponding to one or more new questions, machine learning-based interaction evaluation server 108 is configured to leverage the fine-tuned reasoning and answer language model to perform evaluation of those one or more questions against new interactions (e.g., originating from recorded interaction source servers) during the inference phase. For example, for each new interaction that is recorded by a recorded interaction source server (e.g., 102, 104, and 106), machine learning-based interaction evaluation server 108 is configured to programmatically prompt the reasoning and answer language model to evaluate that interaction using each pair of question and corresponding evaluation plan that was previously defined during the earlier configuration/calibration phase to obtain a corresponding evaluation result. For example, the reasoning and answer language model generated evaluation result of new interactions against previously defined pairs of questions and corresponding evaluation plans can be presented at a user interface at a client device (e.g., client device 112) for a quality assurance user. As mentioned above, the machine learning generated evaluation result of a question for a given interaction may include not only the answer to each question (e.g., a "yes" value, a "no" value, or some other value) but also a set of reasoning (e.g., described in natural language) that supports the answer as well as citations (e.g., text snippets, audio segments, and/or timestamps) to portions of the new interaction that are relevant to the set of reasoning. The quality assurance user can efficiently review the machine learning generated evaluation results of the new interaction corresponding to the one or more previously defined questions without having to manually read/listen through the new interaction in its entirety. In some embodiments, the user interface that presents the evaluation results of new interactions also includes interactive elements that enable the quality assurance user to provide feedback (e.g., a confirmation of the evaluation result's correctness, edits, corrections, modifications) to any portion of the evaluation results. Such user feedback is then included by machine learning-based interaction evaluation server 108 into a feedback dataset, which can be used to later fine-tune the reasoning and answer language model for continuous improvement and alignment with desired domain-expertise.

As suggested by system 100 of FIG. 1, various embodiments described herein enable the configuration of a machine learning model (the reasoning and answer language model) to programmatically answer new (user submitted) questions for a given recorded interaction using domain-knowledgeable evaluation plans. After the reasoning and answer language model has been configured to programmatically answer such questions, the model can then be efficiently leveraged to evaluate the previously defined/configured questions for each new interaction. As described above and will be described in further detail below, user feedback to the machine generated evaluation plans and/or evaluation results are included in training data that will be used to continuously fine-tune/improve/align the models with desired evaluation accuracy and curb the risk of LLM related hallucinations.

Figure 2:
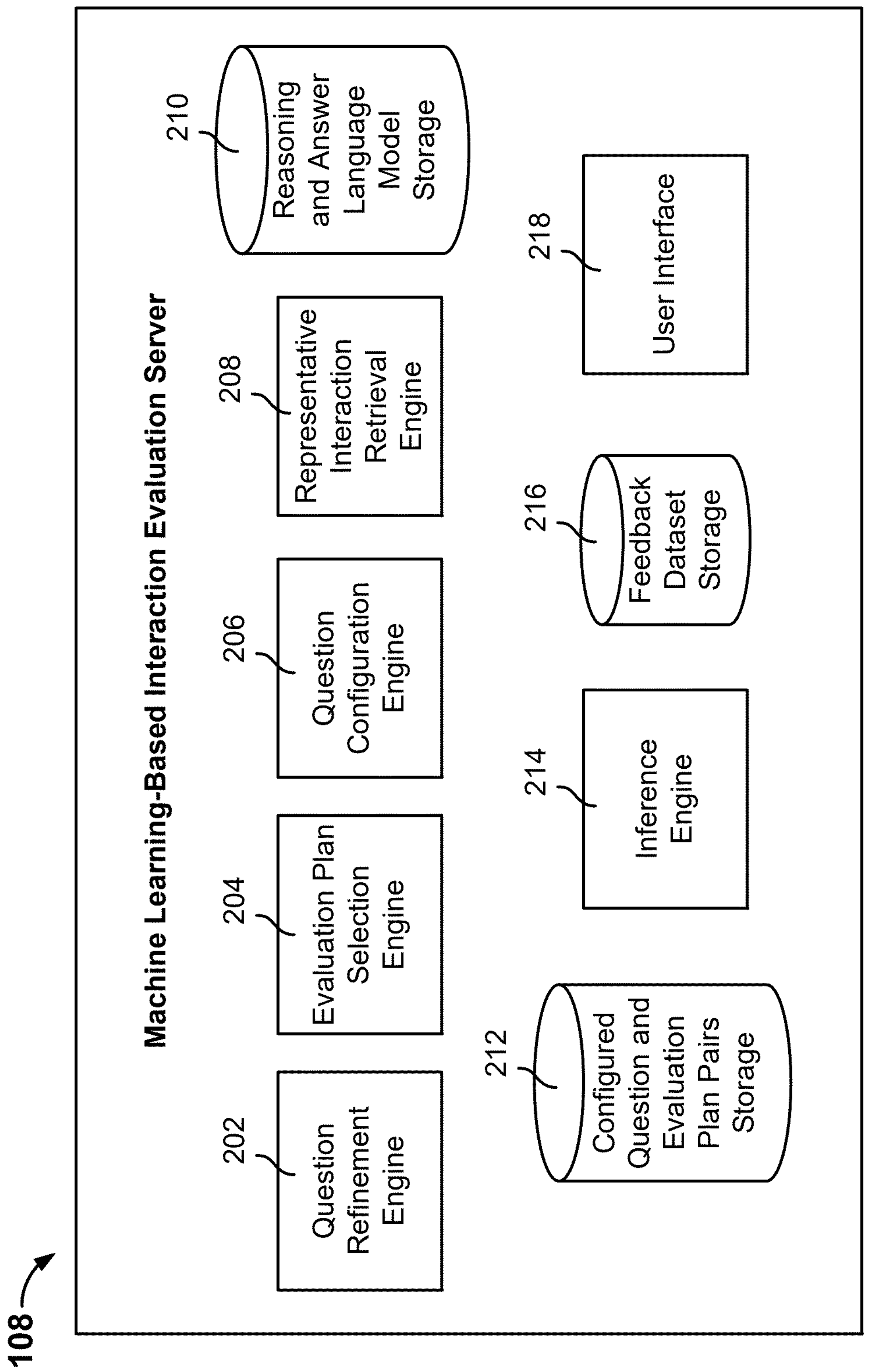
FIG. 2 is a diagram showing an example of a machine learning-based interaction evaluation server in accordance with some embodiments.

FIG. 2 is a diagram showing an example of a machine learning-based interaction evaluation server in accordance with some embodiments. In FIG. 2, the example of the machine learning-based interaction evaluation server includes question refinement engine 202, evaluation plan selection engine 204, question configuration engine 206, representative interaction retrieval engine 208, reasoning and answer language model storage 210, configured question and evaluation plan pairs storage 212, inference engine 214, feedback dataset storage 216, and user interface 218. In some embodiments, each of question refinement engine 202, evaluation plan selection engine 204, question configuration engine 206, representative interaction retrieval engine 208, reasoning and answer language model storage 210, configured question and evaluation plan pairs storage 212, inference engine 214, feedback dataset storage 216, and user interface 218 may be implemented using software and/or hardware (e.g., one or more processors and one or more memories configured to store instructions for the processor (s)).

Question refinement engine 202 is configured to receive and review user submitted new questions, during the configuration phase, to configure a reasoning and answer language model to programmatically answer. In some embodiments, a configuration user interface can be provided by user interface 218 to receive a new question that the submitting user intends for the reasoning and answer language model to programmatically answer for a given interaction. As mentioned above, in the example context of performing quality assurance on interactions recorded at a contact center, each new question may evaluate an aspect of the agent's performance in providing assistance to a customer. In some embodiments, question refinement engine 202 can prompt a question refining LLM to analyze the submitted new question to determine whether additional information is needed to clarify the question. For example, question refining LLM can provide a conversation format style of questioning of the submitting user over the user interface to gather more specific details to refine the initial version of the question towards an actionable, unambiguous instruction. Question refinement engine 202 can then synthesize the received question and any additional information into a refined question. In some embodiments, the refined question comprises a "human-understandable consolidated representation" of the gathered question and additional information. In some embodiments, question refinement engine 202 can also predict a probability that the refined question can be answered by the reasoning and answer language model with acceptable accuracy.

Evaluation plan selection engine 204 is configured to receive a refined question from question refinement engine 202 and obtain a set of candidate evaluation plans corresponding to the refined question during the configuration phase. In various embodiments, each candidate evaluation plan is an alternative "machine-understandable representation" of the refined question (which is a "human-understandable consolidated representation") that is configured to guide the reasoning and answer language model to correctly evaluate a given interaction to answer the refined question. In some embodiments, a candidate evaluation plan may include components such as keyword spotting processors, a library of application programming interfaces (APIs) that interface with custom machine learning models (e.g., SVMs, decision trees), and predefined automation steps. A first example of a candidate evaluation can be obtained by matching the key characteristics that are identified from the refined question to a library of previously generated, domain-relevant evaluation plans to determine an evaluation plan that includes criteria for evaluating the instruction of the refined question. A second example of a candidate evaluation can be obtained by prompting an evaluation plan generating LLM to output a set of criteria that can be understood by another LLM to evaluate an interaction against a given interaction. For example, this evaluation plan generating LLM comprises a foundation LLM that has been trained on a broad set of data and/or has been empirically determined to possess domain-relevant knowledge (e.g., to contact center interaction evaluation). As will be described in further detail below, evaluation plan selection engine 204 is configured to score each candidate evaluation plan against historical data to determine a corresponding accuracy for that evaluation plan. In some embodiments, evaluation plan selection engine 204 is configured to select the candidate evaluation plan with the highest accuracy to be stored as a predefined pair with the refined question in configured question and evaluation plan pairs storage 212.

Question configuration engine 206 is configured to preview the quality of evaluation of the current reasoning and answer language model corresponding to each of one or more unique, refined questions and periodically fine-tune the reasoning and answer language model with user feedback to its preview evaluation results during the configuration phase. In some embodiments, question configuration engine 206 is configured to request representative interaction retrieval engine 208 to obtain a set of representative interactions to use to preview the quality of the current reasoning and answer language model corresponding to each refined question. In some embodiments, representative interaction retrieval engine 208 is configured to search for historical interactions (e.g., stored at the machine learning-based interaction evaluation server or at a separate location) that are relevant to the refined question and return these historical interactions to question configuration engine 206. Then, for each representative interaction that was retrieved for the refined question, question configuration engine 206 is configured to prompt the current reasoning and answer language model to evaluate that representative interaction with the guidance of the refined question's corresponding evaluation plan (e.g., from the (question, evaluation plan) pair that is stored at configured question and evaluation plan pairs storage 212). In response to the prompt, the reasoning and answer language model is configured to output a preview evaluation result, which includes at least a predicted answer (e.g., either a "yes," "no," or another answer type) to the refined question and a set of reasoning (e.g., described in human-understandable text) behind the answer and potentially even snippets or other references to portions of the representative interaction to support the reasoning. Question configuration engine 206 is configured to present the preview evaluation result of the refined question against the representative interaction at a preview user interface (provided by user interface 218) to a user (e.g., the same user that had submitted the refined question or a different reviewer user). This preview user interface includes tools/interactive elements that enable the reviewing user to provide edits/corrections/feedback/confirmation to any portion of the preview evaluation result: the predicted answer, the set of reasoning, and the cited snippets/portions of the representative interaction to support the set of reasoning. Each instance of a preview evaluation result that receives user feedback is included by question configuration engine 206 in a feedback dataset stored at feedback dataset storage 216. In some embodiments, question configuration engine 206 is configured to periodically or in response to a trigger (e.g., the accuracy of the reasoning and answer language model falling below a desired threshold), generate training data from the feedback dataset stored at feedback dataset storage 216 to use to fine-tune the reasoning and answer language model. For example, fine-tuning the reasoning and answer language model may include question configuration engine 206 determining a difference between each preview evaluation result and the user corrected/modified version of that preview evaluation result, computing a loss function based at least in part on this difference (e.g., that may be aggregated with the difference between other preview evaluation results and their corrected versions), and updating parameters of the reasoning and answer language model based on this loss function. The current parameters of the reasoning and answer language model are stored at reasoning and answer language model storage 210.

Inference engine 214 is configured to use the (e.g., fine-tuned) reasoning and answer language model (e.g., for which the current parameters are stored at reasoning and answer language model storage 210) to evaluate a new interaction (e.g., obtained from a recorded interaction source server such as one of 102, 104, and 106) against one or more previously configured questions (e.g., for which pairs of the questions with their corresponding evaluation plans are stored at configured question and evaluation plan pairs storage 212). For example, during inference, inference engine 214 is configured to prompt the reasoning and answer language model to act in a specified role (e.g., a quality assurance analyst) and to answer previously configured Question A for the new interaction under the guidance of the previously defined evaluation plan corresponding to Question A, prompt the reasoning and answer language model to answer previously configured Question B for the new interaction under the guidance of the previously defined evaluation plan corresponding to Question B, and so forth. The reasoning and answer language model's output of each answer for the new interaction to a particular question given the question's evaluation plan is a corresponding evaluation result (which, as mentioned above, includes a "yes" or "no" or another answer, a set of reasoning behind the answer, and/or a set of portions of the new interaction that are relevant to the set of reasoning). In some embodiments, inference engine 214 is configured to present the evaluation result of the new interaction for a given question at a reviewer user interface (provided by user interface 218) to a user (e.g., a quality assurance user whose role is to assess the quality of recorded interactions). This reviewer user interface includes tools that enable the reviewer user to provide edits/corrections/feedback/confirmation to any portion of the evaluation result, the predicted answer, the set of reasoning, and the cited snippets/portions of the new interaction to support the set of reasoning. Each instance of evaluation result at inference that receives user feedback is included by inference engine 214 in a feedback dataset stored at feedback dataset storage 216. In some embodiments, inference engine 214 is configured to periodically or in response to a trigger (e.g., the accuracy of the reasoning and answer language model falling below a desired threshold), generate training data from the feedback dataset stored at feedback dataset storage 216 to use to fine-tune the reasoning and answer language model. For example, fine-tuning the reasoning and answer language model may include inference engine 214 determining a difference between each inference-time evaluation result and the user corrected/modified version of that inference-time evaluation result, computing a loss function based at least in part on this difference (e.g., that may be aggregated with the difference between other inference-time evaluation results and their corrected versions), and updating parameters of the reasoning and answer language model based on this loss function. The current parameters of the reasoning and answer language model are stored at reasoning and answer language model storage 210.

FIG. 3 is a flow diagram showing an example process for preparing and using a reasoning and answer language model to programmatically evaluate interactions in accordance with some embodiments. In some embodiments, process 300 may be implemented by machine learning-based interaction evaluation server 108 of FIG. 1.

At 302, during a configuration phase, a reasoning and answer language model is configured to generate preview evaluation results corresponding to each of a plurality of new questions based at least in part on representative interactions. As will be described in further detail below, at configuration/calibration time, new questions that evaluate respective aspects of interactions may be configured/submitted by users at a user interface for a reasoning and answer language model to be fine-tuned to answer correctly.

At 304, during an inference phase, the reasoning and answer language model is prompted to provide evaluation results corresponding to the plurality of new questions for a new interaction. After the completion of (e.g., one round of the configuration phase) and at inference time, the reasoning and answer language model is then deployed to evaluate new interactions. As will be described in further detail, the reasoning and answer language model may be prompted more than once to evaluate each new question. In particular, the reasoning and answer language model may be prompted separately for each new interaction, each time to evaluate the new interaction given a different question (for which the model was previously configured) and using that question's corresponding evaluation plan. As such, the same reasoning and answer language model can be used to evaluate different aspects (as embodied in the questions) of each new interaction in a programmatic and consistent manner.

FIG. 4 is a flow diagram showing an embodiment of a process for configuring a reasoning and answer language model to programmatically evaluate interactions. In some embodiments, process 400 may be implemented by machine learning-based interaction evaluation server 108 of FIG. 1. In some embodiments, step 302 of process 300 of FIG. 3 may be implemented, at least in part, using process 400. For example, an instance of process 400 may be implemented to configure a reasoning and answer language model to programmatically evaluate interactions for each new question in step 302 of process 300 of FIG. 3.

At 402, an evaluation plan is obtained to correspond to a new question. For each new question, a corresponding evaluation plan to guide the reasoning and answer language model, an LLM, to answer the question is obtained. In some embodiments, multiple candidate evaluation plans corresponding to the new question are first obtained. Then, the candidate evaluation plan that is determined to be the most accurate is selected to correspond to the new question.

At 404, a representative interaction is retrieved based at least in part on the new question. A corresponding set of one or more representative interactions (e.g., with characteristics that match those of a new question) is retrieved for each new question. In some embodiments, historical interactions are converted into respective embeddings, each of which comprises a vector that stores characteristics (that represent the meaning) of a historical interaction. The new question is also converted into a corresponding embedding using a similar embedding mode. The question embedding is then compared to the embeddings of historical interactions to determine a set of historical interactions that are most similar and therefore relevant to the question to serve as the set of representative interactions.

At 406, a reasoning and answer language model is used to evaluate the representative interaction against the new question based at least in part on the evaluation plan and to provide a preview evaluation result. The reasoning and answer language model is then prompted to generate a preview evaluation result for each representative interaction that has been retrieved for each new question using the evaluation plan corresponding to that question.

At 408, the new question and the preview evaluation result of the representative interaction are output at a user interface. The preview evaluation result is presented at a user interface.

At 410, user feedback to the preview evaluation result is received at the user interface. Via the user interface, a reviewing user can provide edits/corrections, confirmations/validations, or other feedback to the preview evaluation result. The edited preview evaluation result, other user feedback, and/or the unedited preview evaluation result is stored as part of a feedback dataset.

At 412, the reasoning and answer language model is updated based at least in part on the user feedback to the preview evaluation result. Over time, the reasoning and answer language model is fine-tuned using the feedback dataset to continuously improve its subsequent evaluation performance.

Figure 5:
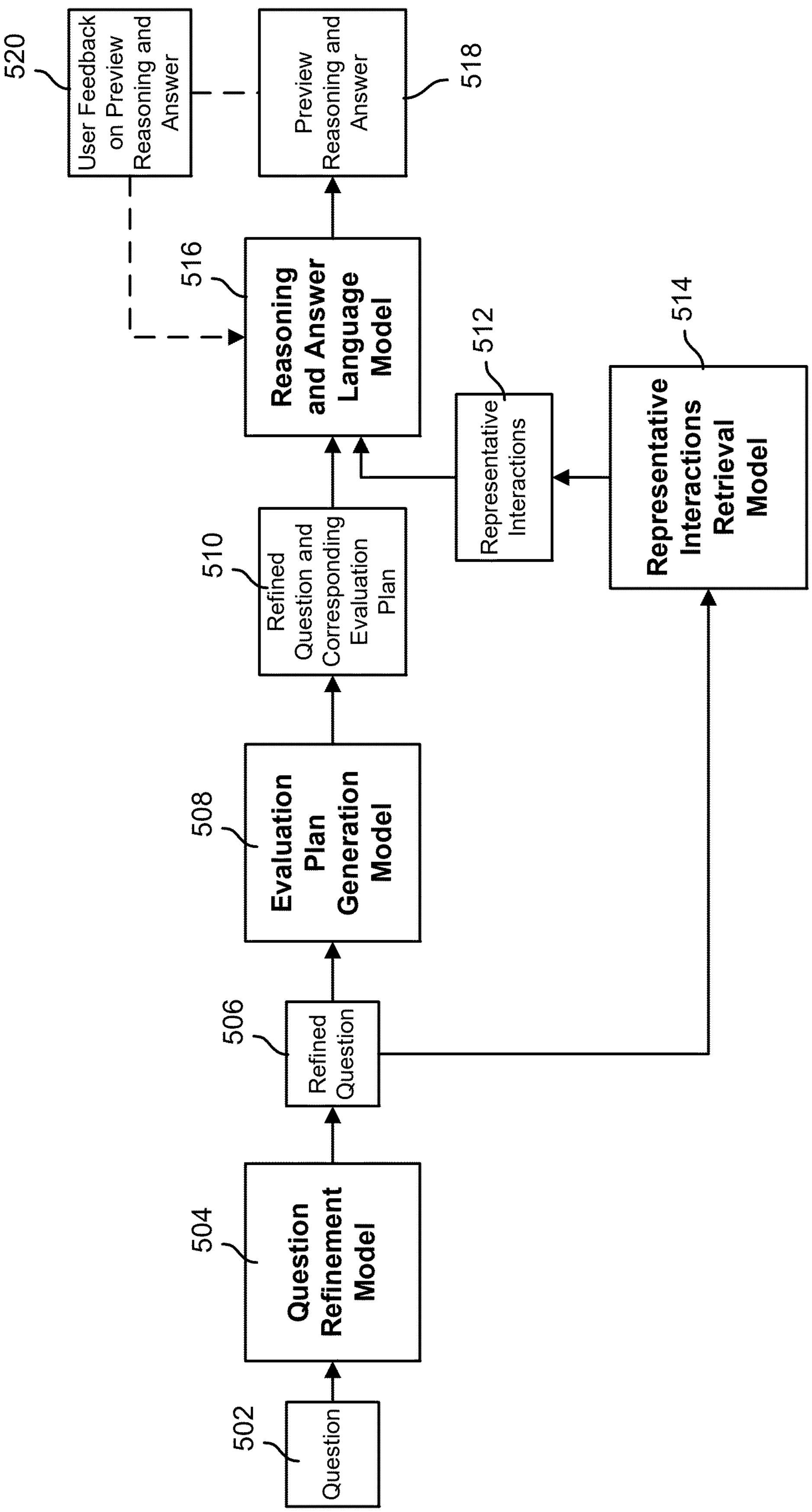
FIG. 5 is an example schematic diagram of the machine learning models that are used to configure a reasoning and answer language model to programmatically evaluate interactions for a new question during a configuration phase in accordance with some embodiments.

FIG. 5 is an example schematic diagram of the machine learning models that are used to configure a reasoning and answer language model to programmatically evaluate interactions for a new question during a configuration phase in accordance with some embodiments. In some embodiments, process 400 of FIG. 4 may be implemented, at least in part, using the process outlined in FIG. 5.

Question 502 (a question that is phrased in natural language) that is submitted by a user to configure reasoning and answer language model 516 is fed into question refinement model 504. In some embodiments, question refinement model 504 comprises an LLM that is configured to solicit information from the question submitting user via a configuration user interface until the LLM determines that sufficient information has been received to refine the originally submitted question to refined question 506, a human-understandable instruction that can be performed by the downstream reasoning and answer language model 516. In some embodiments, any LLM that possesses high reasoning ability and domain knowledge can be used to implement question refinement model 504. In some embodiments, the LLM that is selected to act at question refinement model 504 is selected based on empirical/qualitative analysis for its efficacy in performing question refinement on a set of test questions. For example, question refinement model 504 can be implemented using Anthropic's Claude 3.5 Sonnet). Refined question 506 is fed into evaluation plan generation model 508. In some embodiments, evaluation plan generation model 508 comprises another LLM that is prompted to generate an evaluation plan that comprises a machine-understandable representation of refined question 506, where the evaluation plan comprises a set/list of text-based criteria/components of the instruction that need to be met by an interaction in order for the answer to refined question 506 to be a "yes." In some embodiments, evaluation plan generation model 508 is trained using training data that comprises (Input, Output) pairs generated by both human annotations and/or generated by a more powerful LLM. Evaluation plan generation model 508 learns to include the relevant factors from its world knowledge from the LLM pre-training process as well as task specific fine-tuning with the (input, output) pairs mentioned above. Evaluation plan generation model 508 learns the format also from the task specific fine-tuning/training. For example, where evaluation plan generation model 508 comprises an LLM, evaluation plan generation model 508 may comprise a fine-tuned version of Anthropic's Claude 3.5 Sonnet. As will be described below, in some other embodiments, multiple candidate evaluation plans can be generated using different techniques, at least one of which is using an LLM and at least one of which is not using the LLM and then the different candidate evaluation plans can be analyzed to select the candidate evaluation plans with the highest accuracy. The pair of the (selected/generated) evaluation plan that has been generated by evaluation plan generation model 508 and refined question 506 forms refined question and corresponding evaluation plan 510.

Refined question 506 is also separately fed into representative interactions retrieval model 514. Representative interactions retrieval model 514 is configured to identify and retrieve representative interactions 512 corresponding to refined question 506 to preview the quality of the evaluation performed by reasoning and answer language model 516 with respect to refined question and corresponding evaluation plan 510. In some embodiments, representative interactions retrieval model 514 uses an encoder (e.g., embedding) model, which is a task-specific model. This encoder model converts representative interactions into their representative vector encodings (embeddings), and these representations are stored in a vector database. Refined question 506 is encoded using the encoder model and relevant interactions are retrieved based on a vector distance metric. Encoder models are trained for retrieval systems to generate embeddings that minimize the distance metric between a given query (e.g., refined question 506) and a document (e.g., a representative interaction) if the document contains evidence for the given query.

Each representative interaction of representative interactions 512 and refined question and corresponding evaluation plan 510 are fed into reasoning and answer language model 516. Put another way, reasoning and answer language model 516 is prompted with each tuple comprising (refined question and corresponding plan, ith representative interaction), where i=1, . . . , N and there are N representative interactions 512 to output a respective ith instance of reasoning and answer 518. In some embodiments, reasoning and answer language model 516 comprises a Generative AI model developed in-house that generates reasoning and answer in natural language, given a (Interaction, Question, Plan). Reasoning and answer language model 516 is also capable of improving with feedback generated from the configuration and processing pipelines. In some embodiments, reasoning and answer language model 516 was trained using training data that comprises tuples including pairs of questions and corresponding (e.g., expert generated) answers along with annotations of portions of text transcriptions of recorded interactions that provided evidence to the answers. In some embodiments, reasoning and answer language model 516 comprises an LLM. In some embodiments, the input to reasoning and answer language model 516 is a tuple comprising at least a text transcription (and/or audio) of a recorded interaction, the given Question, and the evaluation Plan (e.g., that was generated by evaluation plan generation model 508). In some embodiments, the output from reasoning and answer language model 516 is an instance of preview reasoning and answer 518, which comprises an Answer to the Question as well as a Reasoning (or Rationale) for the Answer. For example, the "Answer" comprises a "yes" or a "no" and the Reasoning comprises one or more sentences that explain why the Answer was determined and potentially cite to portions of the input text transcription/audio. In some embodiments, the LLM used to implement reasoning and answer language model 516 comprises a smaller LLM than the LLM used to implement evaluation plan generation model 508. For example, reasoning and answer language model 516 is a smaller LLM than the LLM used to implement evaluation plan generation model 508 because reasoning and answer language model 516 uses fewer parameters, uses fewer computational resources to execute, and/or charges a lower price for a given number of tokens (e.g., where the price per token ratio is used to infer the number of parameters that is used by a model when the number of parameter information for models is not disclosed by their providers) than evaluation plan generation model 508. For example, reasoning and answer language model 516 may be implemented using Hugging Face's Phi-3-mini-128k-instruct model, which is inferred to use fewer parameters than the LLM (e.g., Anthropic's Claude 3.5 Sonnet) that may be used to implement evaluation plan generation model 508). By choosing to generate an evaluation plan (e.g., once per question) using a larger model (evaluation plan generation model 508) and then reusing that plan multiple times with a smaller model (reasoning and answer language model 516), the domain-expertise of the larger model can be transferred to the smaller model at an overall lower, aggregate computation cost. Also, using a relatively larger LLM with more domain-knowledge (as a result of the large body of data on which it trained) to generate the evaluation plan that will be used to guide a relatively smaller LLM is a promising approach to distill that domain-knowledge into the smaller LLM, especially in resource-constrained scenarios where explicit domain-specific fine-tuning is not feasible.

Each ith instance of preview reasoning and answer 518 (output in response to the tuple comprising (refined question and corresponding plan, ith representative interaction)) is presented at a reviewer user interface. The reviewer user interface includes tools that enable the reviewer user to confirm preview reasoning and answer 518 or submit user feedback in the form of corrections/edits to any portion of the answer, reasoning, and/or cited portions of preview reasoning and answer 518. Any instance of preview reasoning and answer 518 for which user feedback 520 was received is included in a feedback dataset, that will be used and included in training data that is used to eventually fine-tune reasoning and answer language model 516.

Figure 6:
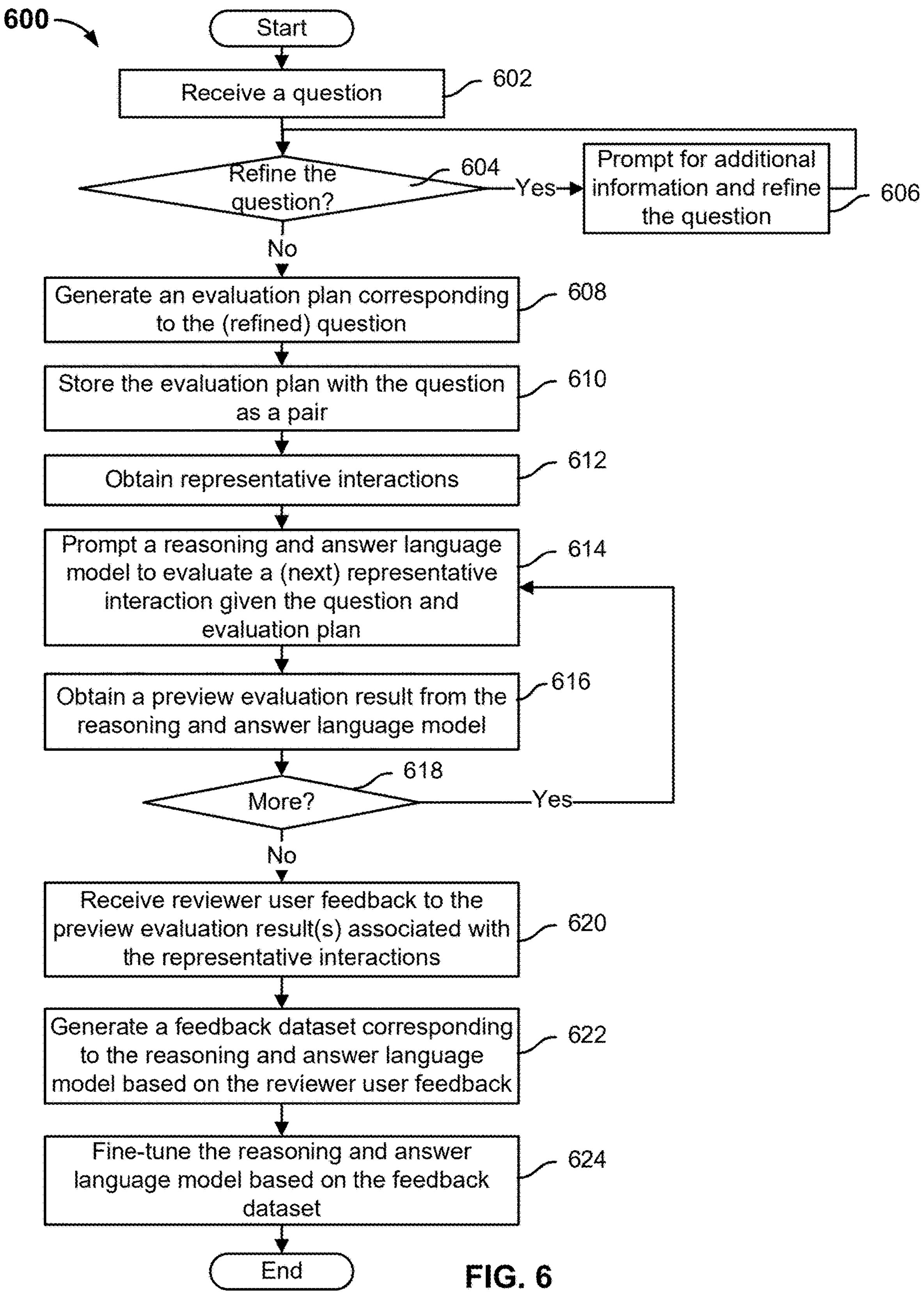
FIG. 6 is a flow diagram showing an example of a process for configuring a reasoning and answer language model to programmatically evaluate interactions in accordance with some embodiments.

FIG. 6 is a flow diagram showing an example of a process for configuring a reasoning and answer language model to programmatically evaluate interactions in accordance with some embodiments. In some embodiments, process 600 may be implemented by machine learning-based interaction evaluation server 108 of FIG. 1. In some embodiments, step 302 of process 300 of FIG. 3 may be implemented, at least in part, using process 600. In some embodiments, process 400 of FIG. 4 may be implemented, at least in part, using process 600. For example, an instance of process 600 may be implemented to configure a reasoning and answer language model to programmatically evaluate interactions for each new question in step 302 of process 300 of FIG. 3.

At 602, a question is received. In some embodiments, the question is received via a configuration user interface.

At 604, whether the question should be refined is determined. In the event that the question should be refined, control is transferred to 606. Otherwise, in the event that the question should not be refined, control is transferred to 608. The submitted question along with any additional information that has been submitted in relation to the question so far are analyzed to determine whether the combination can be synthesized into an actionable, unambiguous instruction.

At 606, additional information is prompted for and the question is refined. As will be described in the example of FIG. 7 described below, additional information to clarify portions of the originally submitted question can be prompted from the configuring user at the configuration user interface.

At 608, an evaluation plan corresponding to the (refined) question is generated. In some embodiments, a set of candidate evaluation plans is generated corresponding to the refined question. For example, each candidate evaluation plan may have been generated using a different technique. Example evaluation plan generation techniques include using an LLM, keyword spotting processors, a library of APIs that interface with custom ML models (e.g., SVMs, decision trees), and predefined automation steps. As will be described in the example of FIG. 8 described below, the respective accuracies of the candidate evaluation plans can be determined and then one candidate evaluation plan can be selected to proceed to step 610.

At 610, the evaluation plan is stored with the question as a pair. The evaluation plan is saved with the question as a pair so that the evaluation plan can be retrieved each time to guide the reasoning and answer language model when the model is prompted to evaluate that question against a given interaction.

At 612, representative interactions are obtained. In some embodiments, historical, recorded interactions are assessed for a subset to serve as representative interactions during the process of configuring a question. For example, each recorded interaction comprises a text transcript of a recorded call and in which the transcript identifies the speaker (e.g., customer or agent) of each line of text. In some embodiments, to determine the representative interactions corresponding to a particular question, the question is converted into an embedding using an embedding model. The question embedding comprises a set of values that represent characteristics of the question. Each historical interaction is also converted into a corresponding embedding using the embedding model. The question embedding is compared to each historical interaction embedding and those historical interactions' embeddings that match closest or are within a given similarity range to the question embedding are retrieved from storage and determined to be a representative interaction for this question.

The following is an example transcript of an interaction:

"Transcript:
customer: hello
agent: hello this is * from my * on a recorded line is this ***
customer: yes
agent: hi *** we're the company that handled the warranty program on your hearing aids and . . .
customer: i don't know but i i didn't get what you said who who are you with now
agent: my essentials and we're the company that carry the warranty program on your hearing aids you have the secure plan with us
customer: i still didn't get
agent: okay what i can do is reach out to your hearing aid provider for them to reach out to you okay
customer: yeah would it send me something that I could read
agent: okay sir i will do that
customer: alright yeah
agent: alright bye bye"

At 614, a reasoning and answer language model is prompted to evaluate a (next) representative interaction given the question and the evaluation plan. For each obtained representative interaction, a prompt to instruct the reasoning and answer language model to evaluate that representative interaction given the question and using the evaluation plan is generated. In some embodiments, this prompt may be generated by populating a predetermined prompt template with the values of the current representative interaction, question, and evaluation plan. The following is an example of such a prompt template to the reasoning and answer language model:

"As a call center Quality Assurance expert, evaluate an agent's interaction based on:
1. The Question
2. Sub-criteria described in the Evaluation Plan
3. The conversation transcript of the Representative Interaction
4. Answer options Analyze the conversation and provide a step-by-step response:
1. Evidences: List relevant points for each sub-criterion
2. Synthesis: Summarize your rationale
3. Conclusion: State the final answer Format your response as follows:
To answer the given question, let's think step by step:
Evidences:
(List evidences for each sub-criterion)
Synthesis:

(Summarize your reasoning)

Hence, the final answer is: (Your chosen answer)"

At 616, a preview evaluation result is obtained from the reasoning and answer language model. As mentioned above, the preview evaluation result includes the predicted answer to the question, the reasoning behind the answer, and the list of evidences (e.g., citations/portions/snippets of the representative interaction) that support the reasoning.

At 618, whether there is at least one more representative interaction to evaluate is determined. In the event that there is at least one more representative interaction to evaluate, control is returned to 614. Otherwise, in the event that there are no more representative interactions to evaluate, control is transferred to 620.

At 620, reviewer user feedback to the preview evaluation result(s) associated with the representative interactions is received. The corresponding preview evaluation result to each representative interaction is presented at a reviewer user interface for a reviewing user to review. At the user interface, when needed, the reviewing user can provide feedback such as a configuration/validation or correction/edit to any portion of the preview evaluation result: the answer to the question, the reasoning behind the answer, and/or the list of evidences (e.g., citations/portions/snippets of the representative interaction) behind the reasoning.

At 622, a feedback dataset corresponding to the reasoning and answer language model is generated. The set comprising the question, evaluation plan, and representative interaction can be stored with the original preview evaluation result and the user feedback (e.g., confirmation/validation and/or modified/edited/corrected preview evaluation result) in the feedback dataset. In some embodiments, an accuracy of the reasoning and answer language model can also be generated based on the number of preview evaluation results for which user feedback had been received. In some embodiments, for a given (question, plan, interaction), if the user does not make an edit to the generated reasoning and predicted answer, then the model response is deemed correct. But if the user does make a correction or edit to the generated reasoning and predicted answer, then the model response is deemed incorrect. Therefore, the accuracy of the system can be determined as (number of correct predictions)/(number of overall predictions).

At 624, the reasoning and answer language model is fine-tuned based on the feedback dataset. The feedback dataset can be used as training data to periodically or in response to a trigger fine-tune the reasoning and answer language model. For example, the trigger can be the determined accuracy of the reasoning and answer language model falling below a desirable threshold. For example, the reasoning and answer language model can be fine-tuned (e.g., the parameters of the model can be adjusted) based on a loss function that is computed from the distance between each preview evaluation result output by the model and the version of preview evaluation result with received user feedback. As such, process 600 shows an automated feedback loop that takes the review user's corrections/feedback as input to continuously improve the accuracy of the reasoning and answer language model, and optionally fine-tune a custom model for a given (question, evaluation plan) pair.

FIG. 7 is a flow diagram showing an example of a process for refining a submitted question during the configuration of a reasoning and answer language model to programmatically evaluate interactions in accordance with some embodiments. In some embodiments, process 700 may be implemented by machine learning-based interaction evaluation server 108 of FIG. 1. In some embodiments, steps 602, 604, and 606 of process 600 of FIG. 6 may be implemented, at least in part, using process 700.

At 702, a submitted question is received via a user interface. A question that describes evaluating an aspect of a participant's performance in a recorded interaction is submitted over a configuration user interface. The question can be phrased in natural language. The following are example questions:

"Did the agent align with customer on reason for call and assure them that they will be able to assist them or that they will get them on the line with the best person to assist them?"

"Did the agent accurately provide next payment date and amount?"

"Did the agent follow the correct process/procedure for a new customer?"

"Was the agent able to refrain from disclosing the customer's phone number in the database?"

"Did the agent properly acknowledge customer inquiry?"

"Did the agent attempt to verify the customer's contact information?"

"Did the agent offer an approved assuring statement?"

"Did the agent clearly explain deposit/cancellation policies as listed under property policies and fees?"

"Did the agent avoid interrupting or talking over customer and show active listening skills?"

"Did the agent ask the customer to take a moment for a brief survey after the call?"

At 704, whether refinement of the submitted question is needed is determined. In the event that refinement of the submitted question is needed, control is transferred to 706. Otherwise, in the event that refinement of the submitted question is not needed, control is transferred to 712. In some embodiments, an LLM is prompted to review the submitted question (and any additional information that has been submitted so far) to identify areas of ambiguity or incomplete information. The LLM is prompted to identify "key characteristics" of the submitted question such as, for example, the main intent, entities involved, conditions or constraints, and any specific actions or outputs expected. Additionally, the LLM is prompted to look for implicit assumptions, areas requiring clarification, and dependencies that might affect execution of the instructions. These "key characteristics" define the boundaries and requirements of the instruction, allowing for effective evaluation plan generation.

At 706, additional information related to the submitted question is prompted for at the user interface. The LLM is prompted to focus on the intent and identify any ambiguities or vague expressions and thereby engage in a step-by-step clarification process, using its conversation format to prompt the configuring user at the configuration user interface for additional context where needed. Each follow-up question aims to gather more specific details to refine the initial question, moving towards an actionable, unambiguous instruction. Each of these exchanges is dynamically logged, allowing the question refining LLM to form a progressively more comprehensive understanding of the task requirements.

At 708, the additional information is received via the user interface.

At 710, the submitted question is refined based on the additional information. Upon achieving a clarified, complete set of instructions, the question refining LLM is instructed to synthesize the gathered information into a refined question, which comprises a "human-understandable consolidated representation" (which may be in natural language) of the question. In some embodiments, the refined question is presented at the configuration user interface for the user to confirm. An example question refining LLM-driven question refinement configuration user interface is also described in FIG. 9A, below.

At 712, the refined question is stored as a predefined question. The refined question is stored and a corresponding evaluation plan is to be obtained/selected/generated for the question, as will be described in the example of FIG. 8, below.

FIG. 8 is a flow diagram showing an example of a process for selecting an evaluation plan corresponding to a predefined question during the configuration of a reasoning and answer language model to programmatically evaluate interactions in accordance with some embodiments. In some embodiments, process 800 may be implemented by machine learning-based interaction evaluation server 108 of FIG. 1. In some embodiments, process 400 of FIG. 4 may be implemented, at least in part, using process 800. In some embodiments, step 608 of process 600 of FIG. 6 may be implemented, at least in part, using process 800.

At 802, a predefined question is received. In some embodiments, the predefined question is obtained using a process such as process 700 of FIG. 7.

At 804, a plurality of candidate evaluation plans is generated based on the predefined question. Once the user confirms the refined question at the configuration user interface (e.g., in process 700 of FIG. 7), the question refining LLM programmatically translates the human-understandable representation of the refined question into one or more candidate evaluation plans, where each evaluation plan comprises a different machine-understandable representation of the distilled logic and configuration required to automate the user's instruction/refined question. Put another way, each candidate evaluation plan captures the distilled, ambiguous logic and configuration required to automate the user's instruction. For example, a candidate evaluation plan may be a schema or configuration that includes components such as keyword spotting processors, a library of APIs that interface with custom machine learning (ML) models (e.g., SVMs, decision trees), and predefined automation steps.

In some embodiments, a candidate evaluation plan can be generated by prompting an evaluation plan generating LLM to generate a list of components/sub-criteria that need to be met in order to produce a particular answer to the refined question. The following is an example prompt to the evaluation plan generation LLM to generate a corresponding candidate evaluation plan (with defined parameters and a requested JSON format):

"As a call center QA expert, break down the given Refined Question into a set of criteria associated with an Evaluation Plan for assessing agent performance. Criteria should be:

Determinable from the conversation alone
Unique and non-repetitive
Clear and concise
Provide a Python-parsable JSON response in this format:
[
{
'name': '<criterion_name>',
'description': '<criterion_description>',
},
. . .
]
Include only the JSON object in your response."

In some embodiments, one or more candidate evaluation plans are obtained by comparing the "key characteristics" (which define the boundaries and requirements of the instruction) of the refined question with attributes associated with a library of predetermined evaluation plans. Each predetermined evaluation plan in the library contains configuration criteria based on similar past cases or domain-specific standards. One candidate evaluation technique can cross-reference the user's clarified intent of the refined question against the library of predetermined evaluation plans to identify those predetermined evaluation plans with relevant characteristics that align with that intent.

In some embodiments, it is advantageous to have multiple candidate evaluation plans to select among because the different candidate evaluation plans may handle diverse tasks and domains effectively. Each candidate evaluation plan is designed to capture a distinct workflow, each aligned with particular task requirements or automation goals, allowing the system to select the most suitable candidate evaluation plan based on the specific characteristics of the clarified user instruction.

At 806, a plurality of accuracies corresponding to respective ones of the plurality of candidate evaluation plans is determined. The candidate evaluation plans then enter a calibration phase, where they are refined and scored against historical data or human QA analyst created evaluation plans. Each candidate evaluation plan is evaluated and assigned a performance score representing its accuracy with respect to historical data or the human generated evaluation plans.

At 808, a candidate evaluation plan to correspond to the predefined question is selected based on the plurality of accuracies. The highest-scoring candidate evaluation plan is selected as the evaluation plan to be used for automating the refined question within the reasoning and answer language model's interaction processing pipeline for executing the instruction on new interactions at inference. An example of selecting a candidate evaluation plan is described in the example of FIG. 9B, below.

At 810, optionally, reviewer user feedback to the selected candidate evaluation plan is received. The selected candidate evaluation plan is presented at a reviewer user interface for a reviewing user to review. At the user interface, when needed, the reviewing user can provide feedback such as a confirmation/validation or correction/edit to any portion (e.g., any of the criteria) of the selected candidate evaluation plan. If user correction is made to the plan, then the corrected version of the selected candidate evaluation plan is stored as a pair with the question.

In some embodiments, the selected candidate evaluation plan is iteratively refined. To refine this plan, initial evaluation rules are generated using the selected candidate evaluation plan. These rules are applied to a set of historical interactions/conversations with known quality assurance outcomes. The selected candidate evaluation plan is used to evaluate this set of historical interactions to generate a set of evaluation results. The selected candidate evaluation plan's set of evaluation results are compared to the known outcomes to identify discrepancies. The selected candidate evaluation plan's configuration/parameters/criteria may then be adjusted based on the identified discrepancies. This refinement may be repeated until a predetermined accuracy threshold is met or a maximum number of iterations is reached. The refined version of the candidate evaluation plan can then be stored as a pair with the question.

At 812, a feedback dataset corresponding to candidate evaluation plan generation technique(s) is generated based on the reviewer user feedback. The set comprising the question can be stored with the selected candidate evaluation plan and the user feedback (e.g., confirmation/validation and/or modified/edited/corrected preview evaluation result) in the feedback dataset. In some embodiments, an accuracy of the evaluation plan generation LLM can also be generated based on the number of selected candidate evaluation plans for which user feedback had been received. In some embodiments, for a given (question, plan, interaction), if the user does not make an edit to the generated reasoning and predicted answer, then the model response is deemed correct. But if the user does make a correction or edit to the generated reasoning and predicted answer, then the model response is deemed incorrect. Therefore, the accuracy of the system can be determined as (number of correct predictions)/(number of overall predictions).

At 814, the candidate evaluation plan generation technique(s) are fine-tuned based on the feedback dataset. The feedback dataset can be used as training data to periodically or in response to a trigger fine-tune the evaluation plan generation LLM. For example, the trigger can be the determined accuracy of the evaluation plan generation LLM falling below a desirable threshold. For example, the evaluation plan generation LLM can be fine-tuned (e.g., the parameters of the model can be adjusted) based on a loss function that is computed from the distance between each original selected candidate evaluation plan and the version of candidate evaluation plan with received user feedback. As such, process 800 shows an automated feedback loop that takes the review user's corrections/feedback as input to continuously improve the accuracy of the evaluation plan generation LLM, and optionally fine-tune a custom model.

FIG. 9A is a diagram showing an example of a configuration user interface over which a user can be prompted by an automated assistant to provide additional information to a submitted question during the configuration of a reasoning and answer language model to programmatically evaluate interactions in accordance with some embodiments. In some embodiments, chat interface 900 is provided by machine learning-based interaction evaluation server 108 of FIG. 1. As shown in FIG. 9A, the configuring user initially inputs "Answer the question—'Did the agent end the call with proper closing?' based on a conversation" at the chat interface of chat interface 900. A refining question LLM may have received the initial submission, analyzed the submission for ambiguity, and generated a follow up query for the user. In the example of FIG. 9A, the question refining LLM may have identified that the phrase "proper closing" was ambiguous or lacked clarity and therefore, the question refining LLM caused the following query of "Certainly! Could you please clarify what qualifies as a 'proper closing'?" to collect additional information to refine the initial submission. The configuring user then provided the additional information on what qualifies as a "proper closing" with "The agent should express gratitude and use branding for the company." In response to the additional information, the question refining LLM determines that sufficient information has been received to synthesize into an actionable, unambiguous instruction, and synthesizes the collected information into the human-understandable consolidated representation of "Thank you! Here's how I think it could be answered. The question can be answered using the context of the conversation, by analyzing the agent's closing statements. The task requires identifying specific phrases or actions that indicate agent showing gratitude towards the customer, confirming if they need any further assistance and using branding statements for the organisation." The human-understandable consolidated representation is also presented within chat interface 900. Upon review of the presented human-understandable consolidated representation, the configuring user can select to either confirm the correctness of the representation of the refined question and proceed to obtaining an evaluation plan, or the configuring user can select to provide additional information to further refine the question.

Figure 9B:
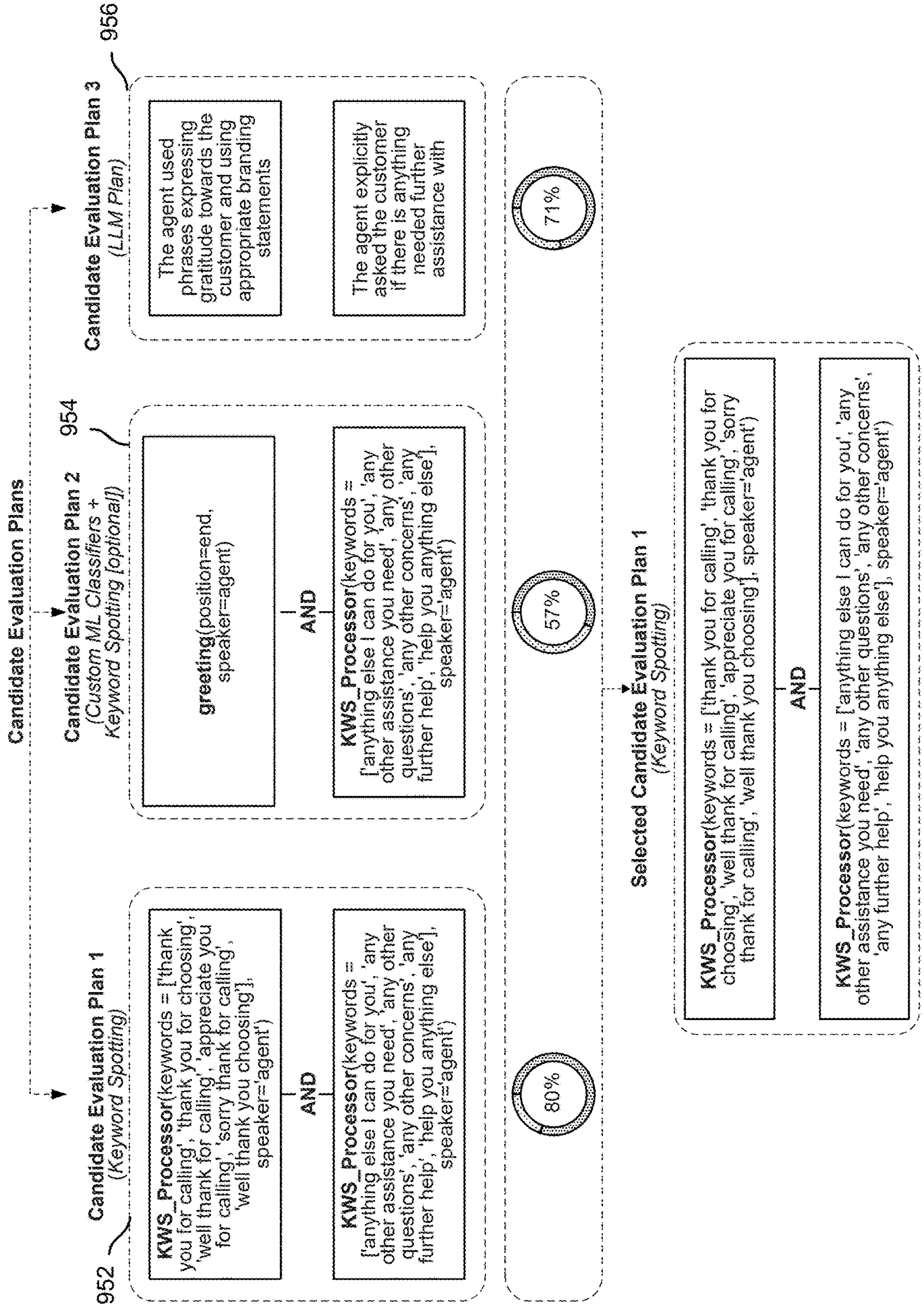
FIG. 9B is a diagram showing example candidate evaluation plans that are obtained corresponding to a refined question during the configuration of a reasoning and answer language model to programmatically evaluate interactions in accordance with some embodiments.

FIG. 9B is a diagram showing example candidate evaluation plans that are obtained corresponding to a refined question during the configuration of a reasoning and answer language model to programmatically evaluate interactions in accordance with some embodiments. In the example of FIG. 9B, three example candidate evaluation plans (candidate evaluation plans 952, 954, and 956) were obtained using three different techniques to the refined question that was defined in FIG. 9A. Candidate evaluation plan 952 is generated using keyword spotting and includes two keyword spotting processors (e.g., expressions) that detect, respectively, for a variation on a phrase that expresses gratitude and a variation on a phrase that expresses an inquiry for any further questions. Candidate evaluation plan 954 is generated using a combination of customer ML classifiers and keyword spotting and includes a custom ML classifier that detects for a greeting made by the agent at the end of an interaction and a keyword spotting processor (e.g., expression) that detects for a variation on a phrase that expresses an inquiry for any further questions. Candidate evaluation plan 956 is generated by an evaluation plan generation LLM and comprises natural language instructions to a downstream reasoning and answer language model. Each of candidate evaluation plans 952, 954, and 956 are compared against historical data or human generated evaluation plans to determine respective accuracies of 80%, 57%, and 71%. Candidate evaluation plan 952 is then selected to be stored as the predefined evaluation plan to pair with the refined question because candidate evaluation plan 952 was determined to have the highest accuracy (80%).

FIG. 10 is a schematic diagram showing prompting of a reasoning and answer language model to programmatically evaluate a representative interaction given a question and evaluation pair in accordance with some embodiments. In the example of FIG. 10, evaluation plan 1002 was generated/selected by evaluation plan generation model 1004 for question 1006 ("Did the agent demonstrate a lack of listening?"). Then, representative interaction 1010 was selected based on question 1006. A prompt for reasoning and answer language model 1008 to evaluate representative interaction 1010 given question 1006 and based on evaluation plan 1002 was generated and fed to reasoning and answer language model 1008. In response, preview evaluation result 1012 was output by reasoning and answer language model 1008.

Figure 11:
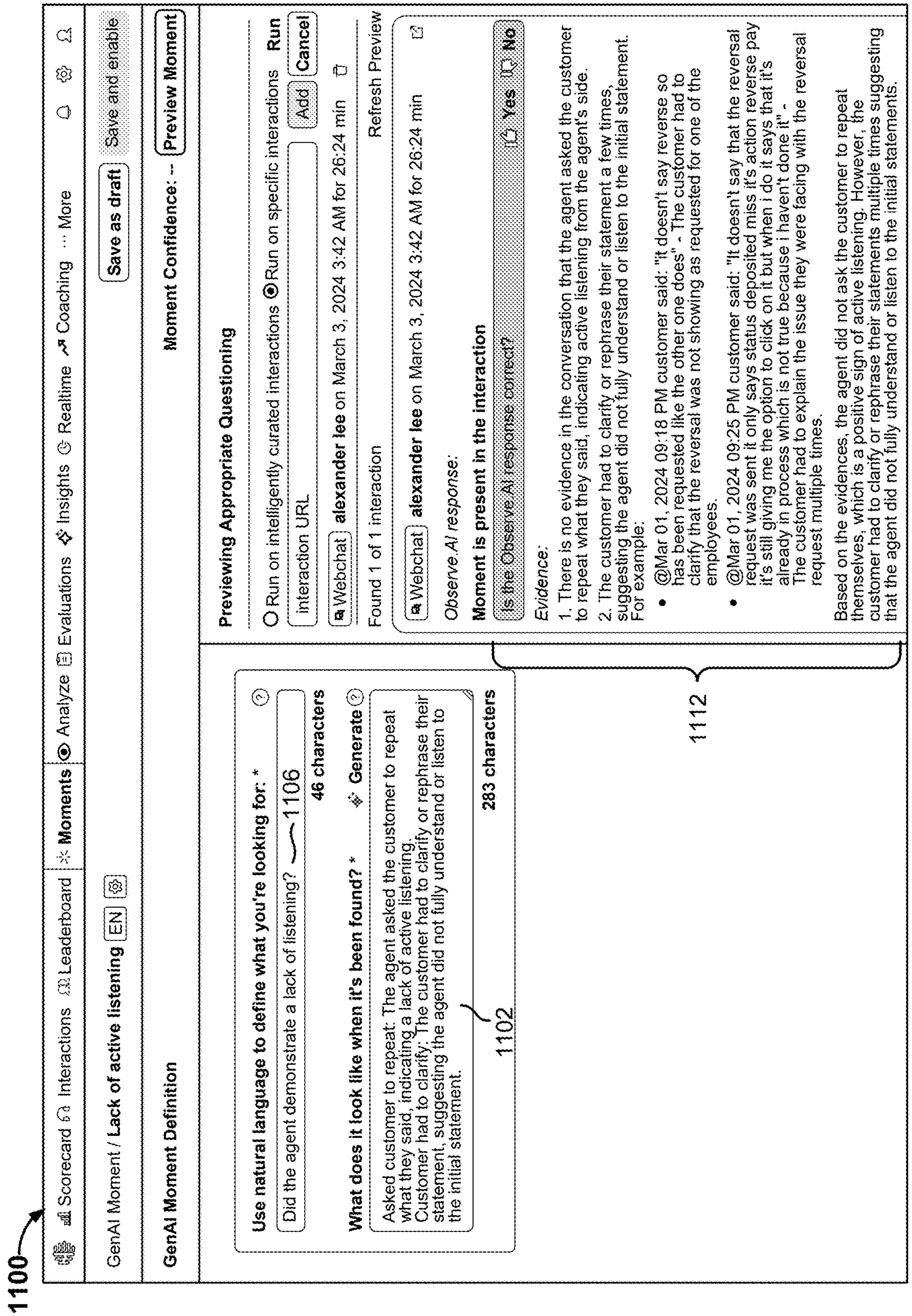
FIG. 11 is an example user interface to present a preview evaluation result during the configuration of a reasoning and answer language model to programmatically evaluate interactions in accordance with some embodiments.

FIG. 11 is an example user interface to present a preview evaluation result during the configuration of a reasoning and answer language model to programmatically evaluate interactions in accordance with some embodiments. In the example of FIG. 11, user interface 1100 is presented to show preview evaluation result 1112 that was output by a reasoning and answer language model in response to being prompted to evaluate a representative interaction given question 1106 ("Did the agent demonstrate a lack of listening?") and based on evaluation plan 1102. At user interface 1100, the reviewing user can review preview evaluation result 1112 and provide corrections/edits to any portion of the answer, reasoning, and/or cited evidences/portions of the representative interaction. Furthermore at user interface 1100, the reviewing user can also indicate that preview evaluation result 1112 is correct and that therefore, no corrections/edits need to be made. As mentioned above, in the event that preview evaluation result 1112 is corrected/edited at user interface 1100, the corrected/edited preview evaluation result 1112 would be included in a feedback dataset that is eventually used to fine-tune the reasoning and answer language model.

Figure 12:
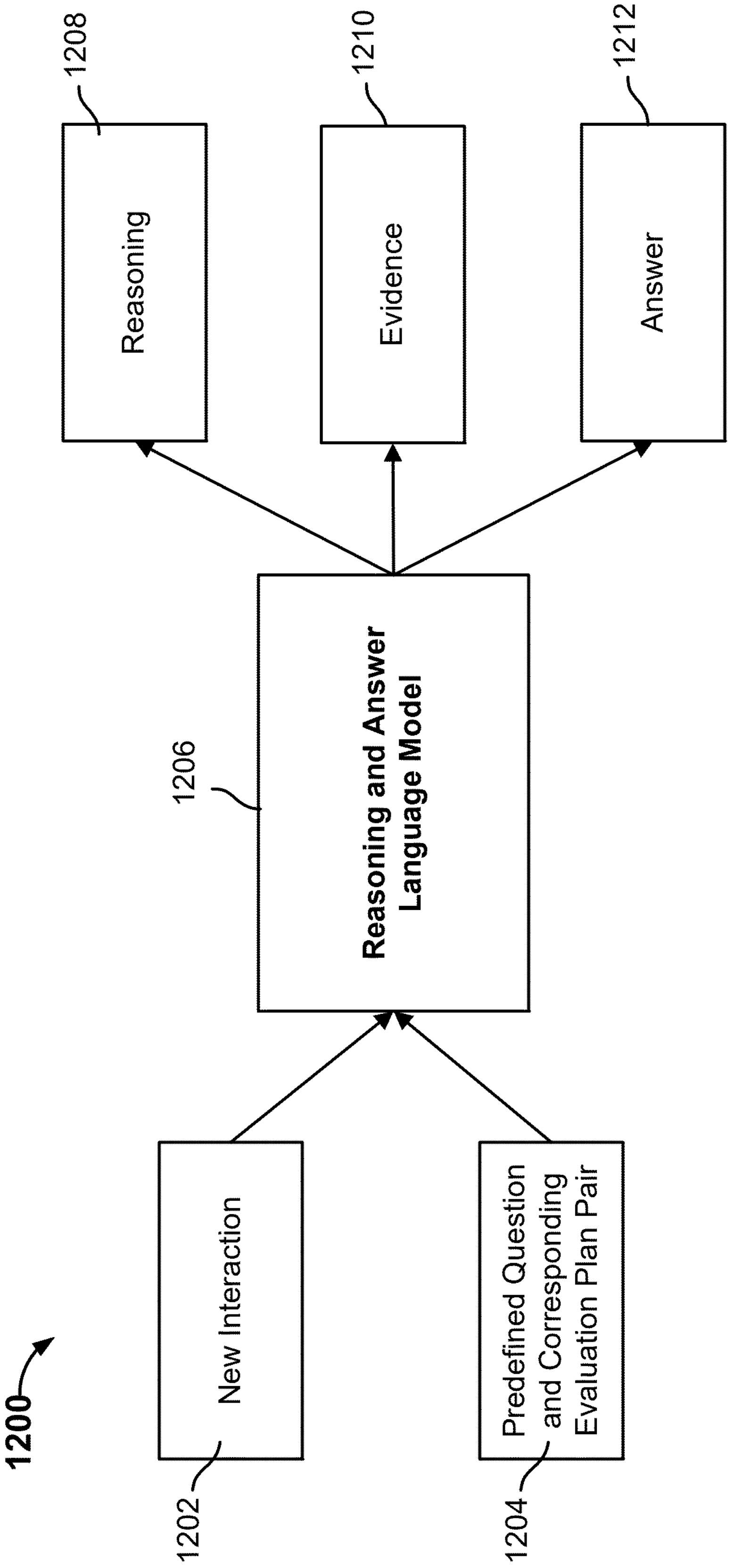
FIG. 12 is a diagram showing the prompting of a reasoning and answer language model at inference to evaluate a new interaction in accordance with some embodiments.

FIG. 12 is a diagram showing the prompting of a reasoning and answer language model at inference to evaluate a new interaction in accordance with some embodiments. As shown in FIG. 12, at inference time, new interaction 1202 is fed into reasoning and answer language model 1206 along with predefined question and corresponding evaluation plan pair 1204. In some embodiments, reasoning and answer language model 1206 has been, during an earlier configuration phase, configured to evaluate representative interactions against one or more pairs of predefined questions and corresponding evaluation plans including predefined question and corresponding evaluation plan pair 1204 using respective one or more instances of a process such as process 400 of FIG. 4 or process 600 of FIG. 6. At inference time, reasoning and answer language model 1206 is configured to output an evaluation result including reasoning 1208, evidence 1210, and answer 1212. As mentioned above, in some embodiments, reasoning 1208 includes a set of one or more rationale behind whether the criteria/sub-components as indicated in the evaluation plan were met by new interaction 1202, evidence 1210 includes one or more text snippets or audio segments from new interaction 1202 that support reasoning 1208, and answer 1212 is a "yes" or "no" answer to the predefined question (that is derived from reasoning 1208). For example and as will be described below, the evaluation result including reasoning 1208, evidence 1210, and answer 1212 can be presented at a user interface for a QA analyst, who can also provide feedback/corrections/edits to any portion of the evaluation result and this user feedback may be used to eventually fine-tune reasoning and answer language model 1206.

FIG. 13 is a flow diagram showing an example of a process for using, at inference, a previously configured reasoning and answer language model to programmatically evaluate new interactions in accordance with some embodiments. In some embodiments, process 1300 may be implemented by machine learning-based interaction evaluation server 108 of FIG. 1. In some embodiments, step 304 of process 300 of FIG. 3 may be implemented, at least in part, using process 1300.

At 1302, a new interaction and a predefined question with which to evaluate the new interaction are received. Process 1300 may be performed separately for the programmatic evaluation of a new interaction against each different predefined question. For example, if there are five different predefined questions, then process 1300 may be executed five times, each time to programmatically evaluate that same interaction against a different predefined question.

At 1304, an evaluation plan corresponding to the predefined question is obtained from storage. As described, a corresponding evaluation plan has already been obtained/selected for each predefined question during the configuration phase (e.g., as described in process 400 of FIG. 4 or process 600 of FIG. 6) and so this plan can be retrieved from storage.

At 1306, a reasoning and answer language model is prompted given the predefined question, the evaluation plan, and the new interaction. As mentioned above, the reasoning and answer language model can be prompted to assume a particular role and evaluate the new interaction using the evaluation plan corresponding to the predefined question.

At 1308, a set of reasoning and answer to the predefined question is received from the reasoning and answer language model. In response to the prompt, the reasoning and answer language model is configured to output an evaluation result comprising at least a set of reasoning, the answer, and a set of evidences (e.g., cited portions of the new interaction) that support the set of reasoning/answer.

At 1310, user feedback to the set of reasoning and answer associated with the new interaction is received via a user interface. The evaluation result to the new interaction is presented at a user interface for a reviewing user to review. At the user interface, the reviewing user can provide feedback such as a confirmation/validation or correction/edit to any portion of the evaluation result: the answer to the question, the reasoning behind the answer, and/or the list of evidences (e.g., citations/portions/snippets of the representative interaction) behind the reasoning.

At 1312, the user feedback is included in a feedback dataset. The set comprising the question, evaluation plan, and new interaction can be stored with the original evaluation result and the user feedback (e.g., confirmation/validation and/or modified/edited/corrected preview evaluation result) in the feedback dataset. In some embodiments, an accuracy of the reasoning and answer language model can also be generated based on the number of evaluation results for which a user correction/edit had been received at inference time. In some embodiments, for a given (question, plan, interaction), if the user does not make an edit to the generated reasoning and predicted answer, then the model response is deemed correct. But if the user does make a correction or edit to the generated reasoning and predicted answer, then the model response is deemed incorrect. Therefore, the accuracy of the system can be determined as (number of correct predictions)/(number of overall predictions).

At 1314, the reasoning and answer language model is fine-tuned based at least in part on the feedback dataset. The feedback dataset can be used as training data to periodically or in response to a trigger fine-tune the reasoning and answer language model. For example, the trigger can be the determined accuracy of the reasoning and answer language model falling below a desirable threshold. For example, the reasoning and answer language model can be fine-tuned (e.g., the parameters of the model can be adjusted) based on a loss function that is computed from the distance between each evaluation result output by the model and the version of the evaluation result with received user feedback. As such, process 800 shows an automated feedback loop that takes the review user's corrections/feedback as input to continuously improve the accuracy of the reasoning and answer language model based on user feedback obtained at inference time, and optionally, fine-tune a custom model for a given (question, evaluation plan) pair.

Figure 14A:
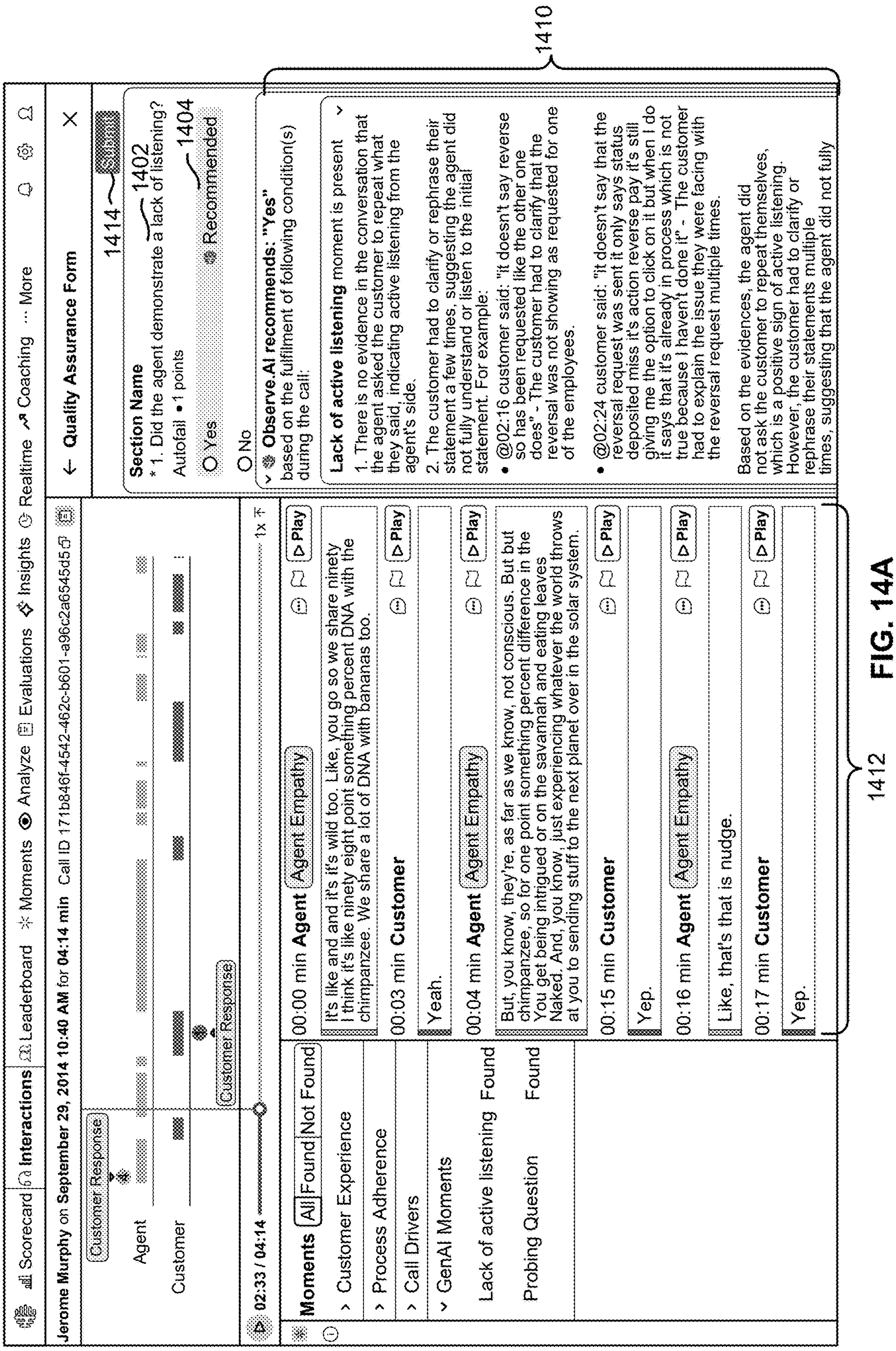
FIG. 14A is a diagram showing an example user interface that is presenting the evaluation result of a predefined question on a new interaction that is output by a reasoning and answer language model at inference time in accordance with some embodiments.

FIG. 14A is a diagram showing an example user interface that is presenting the evaluation result of a predefined question on a new interaction that is output by a reasoning and answer language model at inference time in accordance with some embodiments. The example user interface of FIG. 14A shows predefined question 1402 ("Did the agent demonstrate a lack of listening?") and the determined evaluation result on a given new interaction. The evaluation result includes answer 1404 ("Yes"), reasoning 1410, and portions of the interaction's runtime with text snippets and audio snippets 1412 that support reasoning 1410 and predicted answer 1404. The reviewing user may be a QA analyst who would traditionally need to manually consume the entire recorded interaction (e.g., by listening to the audio recording or by reading the full text transcript) to determine an answer to question 1402. However, the programmatically generated evaluation result that is presented at the example user interface allows the reviewer to much more efficiently evaluate the interaction against question 1402 by being presented with reasoning and answer language model proposed answer 1404 along with natural language reasoning 1410 that supports answer 1404 and also pinpointed portions of the interaction that are relevant to reasoning 1410 and answer 1404. The reviewing user can either confirm that the evaluation result is correct by submitting (via selection "Submit" 1414) predicted answer 1404 ("Yes") or by making one or more corrections to the evaluation result prior to submission, which will be described in FIG. 14B.

Figure 14B:
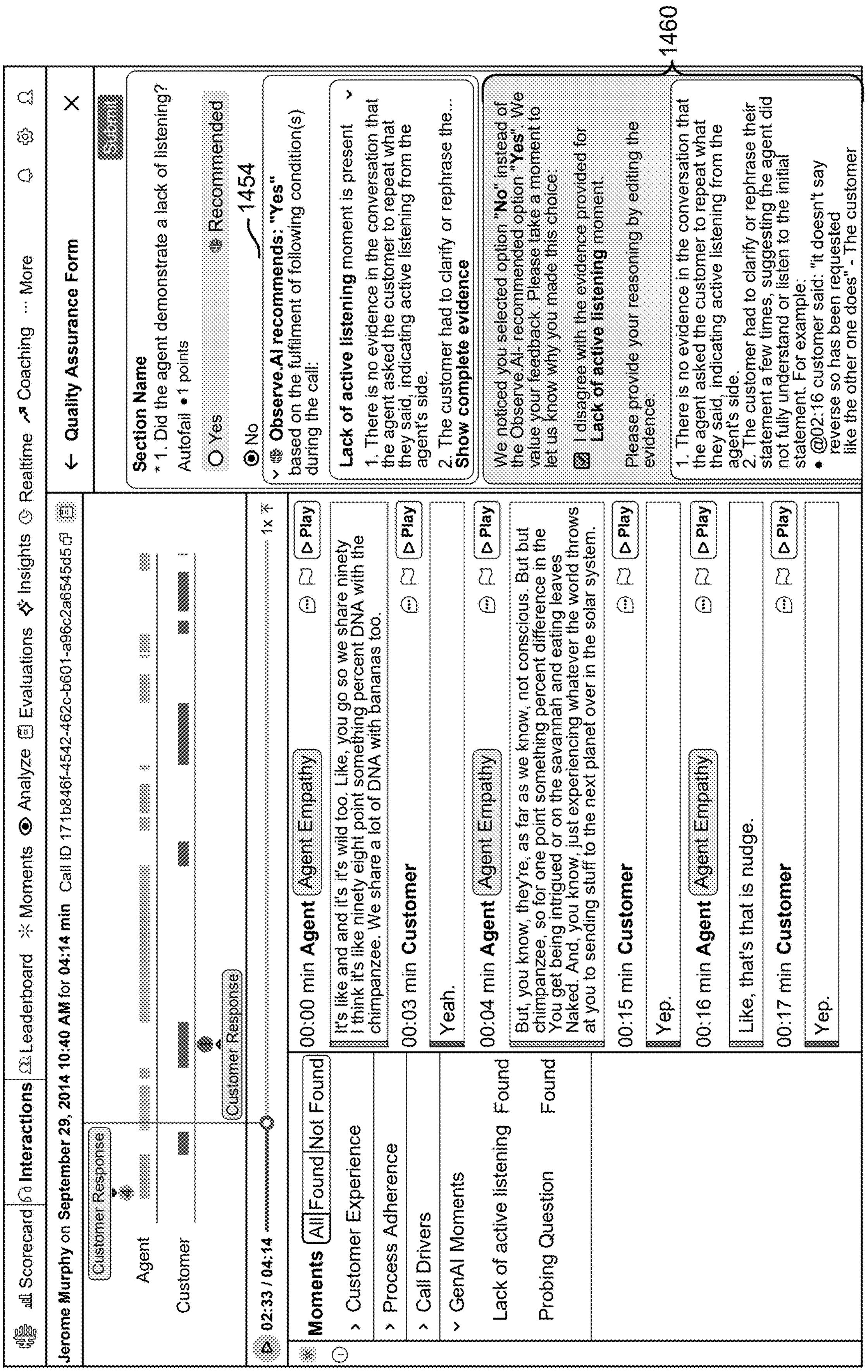
FIG. 14B is a diagram showing an example user interface at which user feedback to the evaluation result has been input.

FIG. 14B is a diagram showing an example user interface at which user feedback to the evaluation result has been input. Referring back to the example of FIG. 14A, if after reviewing the presented evaluation result and/or reviewing at least some of the text snippets and audio segments that were cited as support evidence, the user wants to make a correction to the reasoning and answer language model's generated answer/reasoning, the user can provide a correction to the predicted evaluation result. Specifically, as shown in FIG. 14B, the reviewing user can provide a correction to the predicted evaluation result by selecting a different answer 1454 ("No") that is different than the one that was programmatically predicted ("Yes"). Furthermore, in response to selecting different answer 1454 ("No"), the user interface dynamically updates to solicit the user to provide new reasoning to support the different answer that was selected. At input field 1460, the user can provide new reasoning to support the corrected answer of "No." As mentioned above, user feedback such as the example shown in FIG. 14B can be used to eventually fine-tune the reasoning and answer language model that was used to generate the initial evaluation result for a continuous feedback loop for improvement.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
obtain an evaluation plan to correspond to a new question, wherein to obtain the evaluation plan further comprises to:
analyze the new question using a large language model (LLM) to determine key characteristics;
compare the key characteristics against predefined criteria associated with a library of predetermined evaluation plans to determine a set of candidate evaluation plans;
determine a set of accuracies corresponding to respective ones of the set of candidate evaluation plans; and
select the evaluation plan from the set of candidate evaluation plans based at least in part on the set of accuracies;
retrieve a representative interaction based at least in part on the new question;
use a reasoning and answer language model to evaluate the representative interaction against the new question based at least in part on the evaluation plan and to provide a preview evaluation result;
output, at a user interface, the new question and the preview evaluation result of the representative interaction;
receive, via the user interface, user feedback to the preview evaluation result; and
update the reasoning and answer language model based at least in part on the user feedback to the preview evaluation result; and
a storage device configured to store a feedback data set including the user feedback.

2. The system of claim 1, wherein the one or more processors are further configured to:
receive, via the user interface, a user submitted question;
determine based at least in part on the key characteristics that additional information is needed to clarify the user submitted question; and
present a request for the additional information at the user interface.

3. The system of claim 2, wherein the one or more processors are further configured to:
receive, via the user interface, the additional information; and
synthesize the user submitted question and the additional information into a refined question, wherein the new question comprises the refined question.

4. The system of claim 1, wherein to obtain the evaluation plan further comprises to prompt the LLM to generate one or more candidate evaluation plans to include in the set of candidate evaluation plans based at least in part on the new question.

5. The system of claim 4, wherein the LLM comprises a first LLM, wherein the reasoning and answer language model comprises a second LLM, wherein the first LLM includes more parameters than the second LLM.

6. The system of claim 1, wherein the LLM comprises a first LLM, and wherein the user feedback comprises a first user feedback, wherein the one or more processors are further configured to:
prompt a second LLM to generate one or more candidate evaluation plans to include in the set of candidate evaluation plans;
present the one or more candidate evaluation plans at the user interface;
receive a second user feedback to the one or more candidate evaluation plans; and
update the second LLM.

7. The system of claim 1, wherein to retrieve the representative interaction based at least in part on the new question comprises to:
determine a question embedding corresponding to the new question using an embedding model;
determine interaction embeddings corresponding to historical interactions using the embedding model; and
select the representative interaction by comparing the question embedding to the interaction embeddings.

8. The system of claim 1, wherein the evaluation plan comprises a set of criteria to be met by a given interaction to result in a particular answer to the new question.

9. The system of claim 1, wherein the one or more processors are further configured to store a mapping between the new question and the evaluation plan.

10. The system of claim 9, wherein the one or more processors are further configured to:
receive a new interaction;

determine to evaluate the new interaction using the new question;

obtain the evaluation plan corresponding to the new question in the mapping; and use the updated reasoning and answer language model to evaluate the new interaction against the new question based at least in part on the evaluation plan and to provide a predicted evaluation result.

11. The system of claim 10, wherein the user interface comprises a first user interface, wherein the user feedback comprises a first user feedback, and wherein the one or more processors are further configured to:

present the new question and the predicted evaluation result at a second user interface;

receive, via the second user interface, a second user feedback to the predicted evaluation result; and update the updated reasoning and answer language model based at least in part on the second user feedback to the predicted evaluation result.

12. The system of claim 11, wherein the predicted evaluation result comprises an answer to the new question, a set of reasoning that supports the answer, and a set of evidences from the new interaction that supports the set of reasoning.

13. The system of claim 12, wherein the second user feedback to the predicted evaluation result comprises a correction to at least one of the answer, the set of reasoning, and the set of evidences.

14. A method, comprising:

obtaining an evaluation plan to correspond to a new question, wherein obtaining the evaluation plan further comprises:

analyzing the new question using a large language model (LLM) to determine key characteristics;

comparing the key characteristics against predefined criteria associated with a library of predetermined evaluation plans to determine a set of candidate evaluation plans;

determining a set of accuracies corresponding to respective ones of the set of candidate evaluation plans; and selecting the evaluation plan from the set of candidate evaluation plans based at least in part on the set of accuracies;

retrieving a representative interaction based at least in part on the new question;

using a reasoning and answer language model to evaluate the representative interaction against the new question based at least in part on the evaluation plan and to provide a preview evaluation result;

outputting, at a user interface, the new question and the preview evaluation result of the representative interaction;

receiving, via the user interface, user feedback to the preview evaluation result;

updating the reasoning and answer language model based at least in part on the user feedback to the preview evaluation result; and storing a feedback data set including the user feedback.

15. The method of claim 14, wherein the LLM comprises a first LLM, and wherein the user feedback comprises a first user feedback, the method further comprising:

prompting a second LLM to generate one or more candidate evaluation plans to include in the set of candidate evaluation plans;

presenting the one or more candidate evaluation plans at the user interface;

receiving a second user feedback to the one or more candidate evaluation plans; and updating the second LLM.

16. The method of claim 14, wherein retrieving the representative interaction based at least in part on the new question comprises:

determining a question embedding corresponding to the new question using an embedding model;

determining interaction embeddings corresponding to historical interactions using the embedding model; and selecting the representative interaction by comparing the question embedding to the interaction embeddings.

17. The method of claim 14, wherein the evaluation plan comprises a set of criteria to be met by a given interaction to result in a particular answer to the new question.

18. The method of claim 14, further comprising storing a mapping between the new question and the evaluation plan.

19. The method of claim 18, further comprising:

receiving a new interaction;

determining to evaluate the new interaction using the new question;

obtaining the evaluation plan corresponding to the new question in the mapping; and using the updated reasoning and answer language model to evaluate the new interaction against the new question based at least in part on the evaluation plan and to provide a predicted evaluation result.

* * * * *